United States Patent
Gudivada et al.

(10) Patent No.: US 11,128,751 B2
(45) Date of Patent: Sep. 21, 2021

(54) RETAILER DEVICE BINDING IN MOBILE DEVICES

(71) Applicant: QUALCOMM Incorporated, San Diego, CA (US)

(72) Inventors: Naga Chandan Babu Gudivada, Hyderabad (IN); Prakash Tiwari, Hyderabad (IN); Rajendra Prasad Nelurouth, Hyderabad (IN); Venkata Konda Reddy Reddem, Hyderabad (IN); Venkata Durga Vinod Chikkala, Hyderabad (IN); Phani Pradeep Kumar Kothapalli Venkata, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/513,059

(22) Filed: Jul. 16, 2019

(65) Prior Publication Data

US 2021/0021702 A1    Jan. 21, 2021

(51) Int. Cl.
*H04M 1/725*     (2006.01)
*H04W 4/24*      (2018.01)
*G06Q 40/02*     (2012.01)
*H04M 15/00*     (2006.01)

(52) U.S. Cl.
CPC ........ *H04M 1/72577* (2013.01); *G06Q 40/02* (2013.01); *H04W 4/24* (2013.01); *H04M 15/51* (2013.01)

(58) Field of Classification Search
CPC .. H04M 1/72577; H04M 15/51; G06Q 40/00; G06Q 50/30; G06Q 20/00; G06Q 20/108; G06Q 20/32; G06Q 30/0269; G06Q 10/06; G06Q 10/0631; G06Q 20/102; G06Q 30/04; G06Q 20/14; G06Q 20/18; G06Q 20/401; G06Q 40/12; H04L 67/306; H04L 67/04; H04W 12/08; H04W 88/02; H04W 4/60
See application file for complete search history.

(56) References Cited

U.S. PATENT DOCUMENTS

| | | | |
|---|---|---|---|
| 9,712,664 B1* | 7/2017 | McMullen | H04M 15/723 |
| 2005/0171911 A1* | 8/2005 | Lee | G06F 21/30 705/50 |
| 2010/0299230 A1* | 11/2010 | Patterson | G06Q 20/405 705/30 |
| 2014/0248852 A1* | 9/2014 | Raleigh | H04L 47/22 455/407 |
| 2015/0081365 A1* | 3/2015 | Akita | H04M 1/72583 705/7.15 |

OTHER PUBLICATIONS

International Search Report and Written Opinion—PCT/US2020/070278—ISA/EPO—dated Sep. 15, 2020.

* cited by examiner

*Primary Examiner* — Said M Elnoubi
(74) *Attorney, Agent, or Firm* — The Marbury Law Group

(57) ABSTRACT

A mobile device may be configured to determine, in a secure portion of the mobile device, whether a non-volatile indication (e.g., a fuse or non-volatile bit or flag) allocated to lender binding has been set. A mobile device processor may query a payment server associated with a lender of the mobile device to determine a next payment due date in response to determining that the non-volatile indication allocated to lender binding has been set, and select an operating mode for the mobile device based on a difference between the next payment due date and the current date.

30 Claims, 14 Drawing Sheets

RETAILER DEVICE BINDING IN MOBILE DEVICES

BACKGROUND

A subsidy lock (also called SIM lock, network lock, or carrier lock) is a technical restriction built into a mobile device (e.g., a smartphone) by a mobile device manufacturer that allows a network service provider to restrict the use of the mobile device to specific countries and/or networks. For example, a mobile device may be locked to accept only subscriber identity module (SIM) cards with certain International Mobile Subscriber Identities (IMSIs). The IMSIs may be restricted by mobile country code so will only work with a SIM issued in a specific country, by mobile network code so that it will only work with a specific provider network (e.g., AT&T network, Vodafone network, etc.), or by mobile subscriber identification number so that it will only work with one specific SIM.

Network providers often offer subsidy-locked mobile devices at a discount to customers in exchange for a contract to pay for the use of their network for a specified time period, usually between one and three years. The subsidy lock prohibits users from changing network providers for the contract period. This allows the network provider to recoup the costs of the mobile device over the life of the network service contract. A customer may unlock the mobile device and use any provider network after the contract period expires.

Subsidy locks and the discounted or free mobile device in which such contract-enforcing mechanisms are implemented are popular in many countries and with certain groups of customers because these provisions enable network providers to reduce the upfront costs of mobile device ownership. However, despite these benefits, subsidy locks remain unpopular with a large number of customers in important markets. For example, in some markets, such as India, customers prefer to use multiple SIM cards to switch between competing networks with relative ease. Because subsidy locks restrict the use of mobile devices to a specific network, customers in these markets are less likely to purchase subsidy locked mobile devices.

Recently, global retailers have begun selling mobile devices on Equated Monthly Installment (EMI) plans. An EMI plan involves a fixed payment amount paid by a borrower to a lender at a specified date each calendar month, with payments applied to both interest and principal of a loan until the loan is paid off in full. As such, EMI mobile devices are similar to a subsidy locked mobile device in that a customer makes payments for a period of time, after which they gain additional ownership rights in the mobile device. However, unlike subsidy locked mobile devices, EMI mobile devices support the use of multiple SIMs and/or are not restricted to the use of a specific network. This makes EMI mobile devices attractive to customers that prefer to have simultaneous access rights to multiple competing networks and/or in markets in which subsidy locked mobile devices remain unpopular.

SUMMARY

The various aspects of the disclosure provide methods of operating a mobile device, which may include determining, by a processor in a secure portion of the mobile device, whether a non-volatile indication (e.g., a fuse or non-volatile bit or flag) allocated to lender binding has been set (e.g., a blown fuse), querying, by the processor, a payment server associated with a lender of the mobile device to determine a next payment due date in response to determining that the non-volatile indication allocated to lender binding has been set, selecting, by the processor, an operating mode for the mobile device based on a difference between the next payment due date and the current date, and operating the mobile device in the selected operating mode for a period of time.

In a further aspect, querying the payment server associated with the lender of the mobile device to determine the next payment due date may include determining, by the processor, whether an account balance has been paid in full, and resetting, by the processor, the non-volatile indication allocated to lender binding in response to determining that the account balance has been paid in full. In a further aspect, the method may include the processor setting the non-volatile indication allocated to lender binding in response to determining that the mobile device is subject to a new loan.

In a further aspect, selecting the operating mode for the mobile device based on the difference between the next payment due date and the current date may include determining, by the processor, that the difference between the next payment due date and the current date is within a first period of time (e.g., between 1 and 7 days, etc.), and selecting, by the processor, an encumbered operating mode that requires that the mobile device display a payment-due reminder on the electronic display of the mobile device at a periodic interval in response to determining that the difference between the next payment due date and the current date is within the first period of time.

In a further aspect, selecting the operating mode for the mobile device based on the difference between the next payment due date and the current date may include determining, by the processor, that the difference between the next payment due date and the current date is within a second period of time (e.g., between 0 and 24 hours, etc.) and selecting, by the processor, an encumbered operating mode that requires that the mobile device display a timer indicating the number of hours, minutes, and seconds remaining until the next payment due date in response to determining that the difference between the next payment due date and the current date is within the second period of time.

In a further aspect, selecting the operating mode for the mobile device based on the difference between the next payment due date and the current date may include determining, by the processor, that the difference between the next payment due date and the current date is within a third period of time (e.g., less than 0 but greater than negative 24 hours), and selecting, by the processor, an encumbered operating mode that disables or restricts the use of one or more of the most frequently used software applications on the mobile device in response to determining that the difference between the next payment due date and the current date is within the third period of time (e.g., less than 0 but greater than negative 24 hours).

In a further aspect, selecting the operating mode for the mobile device based on the difference between the next payment due date and the current date may include determining, by the processor, that the difference between the next payment due date and the current date is within a fourth period of time (e.g., less than −1 days but greater than −2 days), and selecting, by the processor, an encumbered operating mode that restricts the use of cellular and WLAN capabilities of the mobile device to only allow communications to a server associated with the lender in response to determining that the difference between the next payment due date and the current date is within the fourth period of time.

In a further aspect, selecting the operating mode for the mobile device based on the difference between the next payment due date and the current date may include determining, by the processor, that the next payment due date is more than an amount of time (e.g., 2 days) prior to the current date, and selecting, by the processor, an encumbered operating mode that disables the mobile device until a suitable passcode is entered by a user of the mobile device.

Further aspects may include a mobile device including a processor configured with processor-executable instructions to perform operations of any of the methods summarized above. Further aspects may include a non-transitory processor-readable storage medium having stored thereon processor-executable software instructions configured to cause a processor in a mobile device to perform operations of any of the methods summarized above. Further aspects may include a mobile device having various means for accomplishing the functions of the methods summarized above.

BRIEF DESCRIPTION OF THE DRAWINGS

The accompanying drawings, which are incorporated herein and constitute part of this specification, illustrate example embodiments of various embodiments, and together with the general description given above and the detailed description given below, serve to explain the features of the claims.

DETAILED DESCRIPTION

Figure 1:
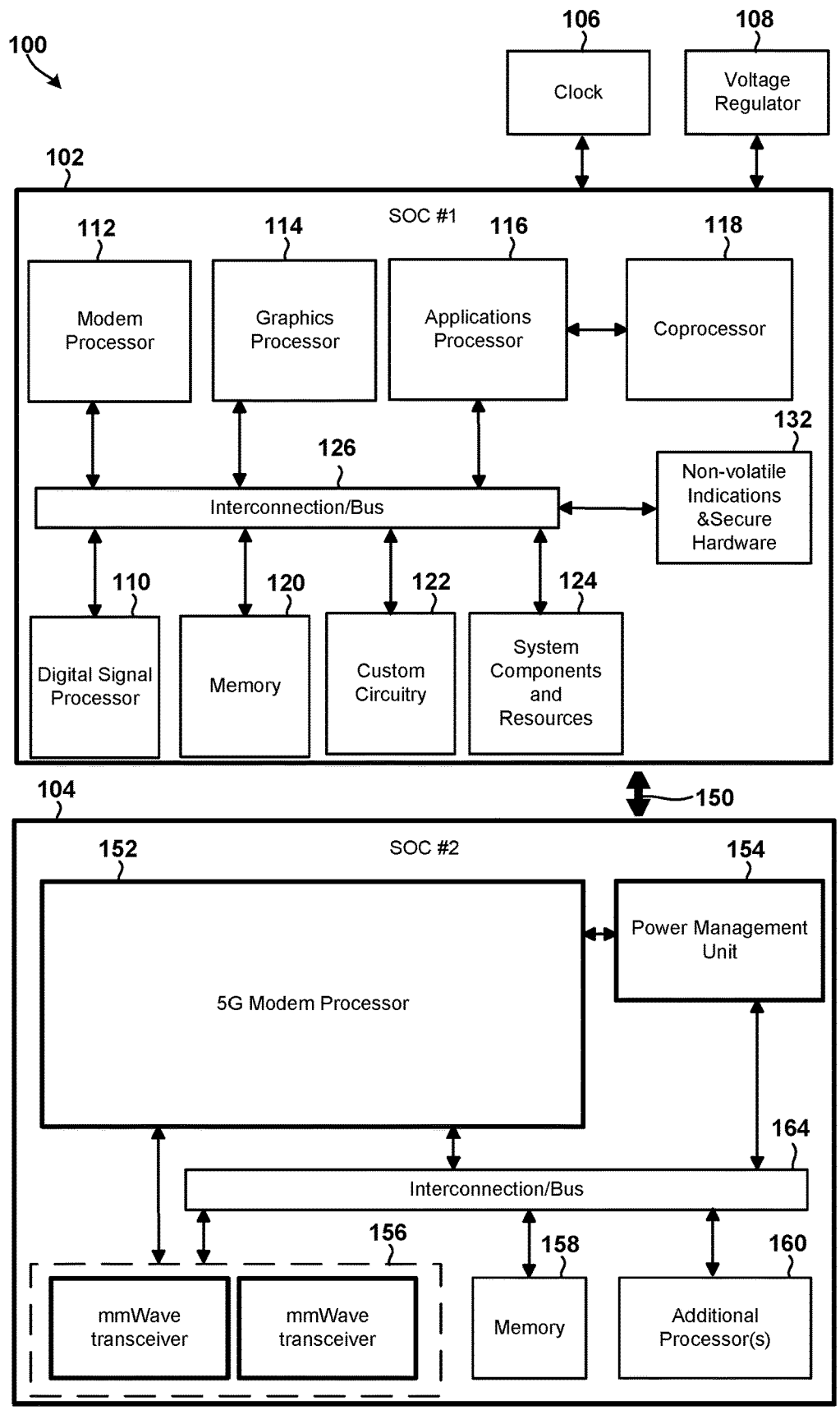
FIG. 1 is a block diagram illustrating an example mobile device that is suitable for implementing progressively more stringent restrictions on the usage of the mobile device in accordance with some embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

The term "mobile device" is used herein to refer to any one or all of cellular telephones, smartphones, Internet-of-things (IOT) devices, personal or mobile multi-media players, wearable devices (e.g., smart watches, smart glasses, etc.) laptop computers, tablet computers, ultrabooks, palmtop computers, wireless electronic mail receivers, multimedia Internet enabled cellular telephones, wireless gaming controllers, smart cars, autonomous vehicles, and similar electronic devices which include a programmable processor, a memory and circuitry for sending and/or receiving wireless communication signals to/from wireless communication networks. While the various embodiments are particularly useful in mobile devices, such as smartphones and tablets, the embodiments are generally useful in any electronic device that includes communication circuitry for accessing cellular or wireless communication networks.

A number of different cellular and mobile communication services and standards are available or contemplated in the future, all of which may implement and benefit from the various embodiments. Such services and standards include, e.g., third generation partnership project (3GPP), long term evolution (LTE) systems, third generation wireless mobile communication technology (3G), fourth generation wireless mobile communication technology (4G), fifth generation wireless mobile communication technology (5G), global system for mobile communications (GSM), universal mobile telecommunications system (UMTS), 3GSM, general packet radio service (GPRS), code division multiple access (CDMA) systems (e.g., cdmaOne, CDMA2000™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iden). Each of these technologies involves, for example, the transmission and reception of voice, data, signaling, and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

A subsidy lock (also called SIM lock, network lock, or carrier lock) is a technical restriction built into a mobile device by a mobile device manufacturer that allows a service provider to restrict the use of the mobile device to specific countries and/or networks. Network providers often offer subsidy locked mobile devices at a discount to customers in exchange for a contract to pay for the use of their network for a specified time period (contract period), usually between one and three years. The subsidy lock prohibits the changing of network providers for the contract period. This allows the network provider to recoup the costs of the mobile device over the life of the contract. A customer may unlock the mobile device and use any provider network after the contract period expires.

Subsidy locks are popular in many countries and/or amongst certain groups of customers because they reduce the upfront costs associated with purchasing a new mobile device. This allows customers to update their mobile device more frequently, and to purchase better and more feature rich mobile devices that provide them with access to new services and/or improved access to existing services. Yet, despite these benefits, subsidy locked mobile devices remain unpopular with certain groups of customers and in many large and important markets. For example, in markets such as India, customers prefer to use multi-SIM devices and/or multiple SIM cards to switch back-and-forth between competing service provider networks. Because subsidy locked mobile devices are restricted to a specific network, customers in India have been reluctant to purchase them.

In addition, new and emerging wireless network technologies, such as 5G, provide improved support for multi-SIM devices and other technologies that allow a mobile device to simultaneously access multiple different radio access technologies and/or to readily switch back-and-forth between competing networks. As more of these technologies emerge, the popularity and use of subsidy locked mobile devices is likely to decrease amongst customers that want to make full use of the features and services they provide.

Recently, global retailers have begun selling mobile devices on EMI plans in which monthly payments by the borrower are applied to interest and principal until the loan used to purchase the mobile device is paid in full. EMI mobile devices are similar to subsidy locked mobile devices in that they reduce or eliminate the upfront costs associated with purchasing a new mobile device, and allow customers to update their mobile device more often and/or to purchase better and more feature-rich mobile devices. Unlike subsidy locked mobile devices, EMI mobile devices support the use of multiple SIMs and/or are not restricted to the use of a specific network. This makes EMI mobile devices attractive to customers in markets such as India in which multi-SIM devices and access to competing service provider networks is important. EMI mobile devices could also become popular with customers that want an affordable way to upgrade to a 5G-capable mobile device and make full use features and services provided by the 5G network. For these reasons, EMI mobile devices are expected to continue to grow in popularity and use in important markets.

However, retailers remain reluctant to offer EMI mobile devices to a wide swath of the population. This is because retailers of conventional EMI mobile devices are less likely to recoup the costs of the mobile devices due to customers failing to make the monthly payment than network providers that offer subsidy locked mobile devices.

Unlike network providers, retailers or lenders do not have access to the technical restrictions built into conventional mobile devices by the manufacturers or to network components within the telecommunication network. When a customer fails to make an EMI payment, a lender, retailer or another entity with whom the user has set up a periodic payment plan for the mobile device (herein collectively "lender") cannot restrict a conventional mobile device's access to the network, remotely control the mobile device, or readily locate the mobile device for repossession. As such, lenders cannot restrict the use of a conventional EMI mobile device or enforce other technical consequences for late or missed payments. Accordingly, customers that purchase conventional EMI mobile devices have little submit their EMI payments on time, and lenders have little or no recourse against criminals or nefarious actors that purchase EMI mobile devices at a significant discount and never make payments.

To ensure customers submit their EMI payments on time, a lender could install a client application on the mobile device that periodically queries a payment server to verify that there are no outstanding or past due EMI payments. If an EMI payment is outstanding or past due, the client application could lock or disable the mobile device until payment is received. However, locking or disabling the mobile device for every nonpayment (e.g., from an otherwise diligent customer that unknowingly misses a payment, etc.) may be a significant annoyance or burden that degrades the user experience. This may deter existing customers, as well as their friends and colleagues, from purchasing EMI mobile devices in the future.

In addition, using conventional solutions, lenders are generally restricted to installing client applications in unprotected or unsecured portions of the mobile device's operating system. As such, a criminal or nefarious actor could modify the client application so that it does not lock or disable the mobile device for missed payments. The criminal or nefarious actor could also circumvent the client application by reformatting the mobile device to delete the client application, and install new software or a new operating system on the mobile device.

Various embodiments overcome the above limitations of conventional solutions, and help ensure that customers submit their EMI payments on time, by equipping the mobile device with secure mechanisms that allow a lender to implement progressively more stringent restrictions on the use of mobile device. For example, a client or retailer/lender agent software application may be installed in a secure portion of mobile device. The mobile device may launch the client or retailer/lender agent as part of its boot sequence, which may determine whether a non-volatile indication allocated to lender binding has been set. A non-volatile indication may be a fuse (e.g., eFuse, QFPROM, etc.) or a secure memory element (e.g., a flag or bit in secure memory). The non-volatile indication (e.g., fuse or secure bit/flag) may be in a secure and/or privileged portion of the mobile device, such as in security enabled hardware, a secure memory, a secure portion of the operating system, a secure operating system (SOS), a trusted execution environment (TEE), the kernel space of the operating system kernel, etc. For ease of reference, the term "non-volatile indication" is used herein as a single term to refer without limitation to any of a variety of non-volatile indications, such as a fuse memory element (e.g., eFuse, QFPROM, etc.), a non-volatile flag in secure memory, or a bit within a secure non-volatile configuration register, or any combination thereof, that is set (e.g., by blowing a fuse) to indicate a condition as described herein.

In response to determining that the non-volatile indication is set, the mobile device or client/agent may request and/or receive payment and due date information via secure communication links to a payment server or a server managed by the retailer, lender, etc. The client/agent may determine whether an installment payment for the current period (e.g., monthly period, bi-weekly period, weekly period, etc.) has been paid and/or the difference between the payment due date and the current date (e.g., 7 days, 24 hours, −2 days, etc.). The mobile device may select an operating mode for the mobile device based on a user profile and/or the difference between the due date and the current date.

For example, if the difference between the due date and the current date is within a first period of time, the mobile device may select a first encumbered operating mode that requires that the mobile device display a payment-due reminder on the electronic display of the mobile device at a periodic interval or at another periodic interval. If the difference between the due date and the current date is between 0 and 1 days, the mobile device may select a second encumbered operating mode that requires that the mobile device display a timer indicating the amount of time (hours, minutes, seconds) remaining until the due date. If the difference between the due date and the current date is between 0 and −1 days (i.e., payment is past due), the mobile device may select a third encumbered operating mode that restricts or disables a select number of the most frequently used applications on the mobile device. If the difference between the due date and the current date is between −1 and −2 days (i.e., payment is 2 days past due), the mobile device may select a fourth encumbered operating mode that disables cellular and WLAN capabilities of the mobile device, or restricts their use to communications and websites related to the lender or that enable payment of the outstanding balance.

These examples are not intended to be limiting, and any number of difference conditions, restrictions and encumbered operating modes may be selected and implemented by a lender based on any range of days or time periods associated with the difference between the due date and the current date.

The mobile device may enter and operate in the selected encumbered operating mode for a period of time (e.g., a predetermined amount of time, until a timer expires, etc.), and then again determine whether the installment payment for the current period has been paid. In response to determining that the monthly installment for the current period has been paid, the mobile device may determine whether the account balance has been paid in full. In response to determining that the account balance has been paid in full, the mobile device may reset the non-volatile indication (e.g., fuse or secure bit/flag) and operate in a normal or unencumbered mode.

Various embodiments may be implemented on a number of single processor and multiprocessor computer systems, including a mobile device having a system-on-chip (SOC) or system in a package (SIP). FIG. 1 illustrates an example mobile device 100 implementing the various embodiments.

In the example illustrated in FIG. 1, the mobile device 100 includes two SOCs 102, 104, a clock 106, and a voltage regulator 108. In some embodiments, the first SOC 102 operate as central processing unit (CPU) of the mobile device that carries out the instructions of software application programs by performing the arithmetic, logical, control and input/output (I/O) operations specified by the instructions. In some embodiments, the second SOC 104 may operate as a specialized processing unit. For example, the second SOC 104 may operate as a specialized 5G processing unit responsible for managing high volume, high speed (e.g., 5 Gbps, etc.), and/or very high frequency short wavelength (e.g., 28 GHz mmWave spectrum, etc.) communications. While the first SOC 102 and the second SOC 104 are illustrated as separate components in FIG. 1, it should be recognized that the first SOC 102 and the second SOC 104 (or portions thereof) may be integrated together into a single SOC.

In the example illustrated in FIG. 1, the first SOC 102 includes a digital signal processor (DSP) 110, a modem processor 112, a graphics processor 114, an application processor 116, one or more coprocessors 118 (e.g., vector co-processor) connected to one or more of the processors, memory 120, custom circuitry 122, system components and resources 124, an interconnection/bus module 126, and non-volatile indications (e.g., fuses) and secure hardware 132. The non-volatile indications (e.g., fuses) and secure hardware 132 may include eFuses, QFPROMs, secure bits, secure flags, security enabled hardware, secure memory, or hardware, software, or firmware that could be allocated to lender binding and/or used to implement a secure portion of the operating system, a secure operating system (SOS), a trusted execution environment (TEE), etc.

The second SOC 104 includes a 5G modem processor 152, a power management unit 154, an interconnection/bus module 164, a plurality of mmWave transceivers 156, memory 158, and various additional processors 160, such as an applications processor, packet processor, etc. In an alternative embodiment, the mmWave transceivers 156 are at least partially implemented as one or more separate chips or components that are not included within the second SOC 104. In addition, while the second SOC 104 is described herein as including a 5G modem processor 152 and mmWave transceivers 156, it should be recognized that the second SOC 104 may additionally or alternatively include a processor and/or transceivers that enable communication according to other standards or technologies, such as LTE.

Each processor 110, 112, 114, 116, 118, 152, 160 may include one or more cores, and each processor/core may perform operations independent of the other processors/cores. For example, the first SOC 102 may include a processor that executes a first type of operating system (e.g., FreeBSD, LINUX, OS X, etc.) and a processor that executes a second type of operating system (e.g., MICROSOFT WINDOWS 10). In addition, any or all of the processors 110, 112, 114, 116, 118, 152, 160 may be included as part of a processor cluster architecture (e.g., a synchronous processor cluster architecture, an asynchronous or heterogeneous processor cluster architecture, etc.).

The first and second SOC 102, 104 may include various system components, resources and custom circuitry for managing sensor data, analog-to-digital conversions, wireless data transmissions, and for performing other specialized operations, such as decoding data packets and processing encoded audio and video signals for rendering in a web browser. For example, the system components and resources 124 of the first SOC 102 may include power amplifiers, voltage regulators, oscillators, phase-locked loops, peripheral bridges, data controllers, memory controllers, system controllers, access ports, timers, and other similar components used to support the processors and software clients running on a mobile device. The system components and resources 124 and/or custom circuitry 122 may also include circuitry to interface with peripheral devices, such as cameras, electronic displays, external memory chips, etc.

The first and second SOC 102, 104 may communicate via interconnection/bus module 150. The various processors 110, 112, 114, 116, 118, may be interconnected to one or more memory elements 120, system components and resources 124, and custom circuitry 122, and the non-volatile indications (e.g., fuses) and secure hardware 132 via an interconnection/bus module 126. Similarly, the processors 152, 160 may be interconnected to the power management unit 154, the mmWave transceivers 156, memory 158, and various additional processors 160 via the interconnection/bus module 164. The interconnection/bus module 126, 150, 164 may include an array of reconfigurable logic gates and/or implement a bus architecture (e.g., CoreConnect, AMBA, etc.). Communications may be provided by advanced interconnects, such as high-performance networks-on chip (NoCs).

The first and/or second SOCs 102, 104 may further include an input/output module (not illustrated) for communicating with resources external to the SOC, such as a clock 106 and a voltage regulator 108. Resources external to the SOC (e.g., clock 106, voltage regulator 108) may be shared by two or more of the internal SOC processors/cores.

In addition to the mobile device 100 discussed above, the various embodiments may be implemented in a wide variety of computing systems, which may include a single processor, multiple processors, multicore processors, or any combination thereof.

Figure 2A:
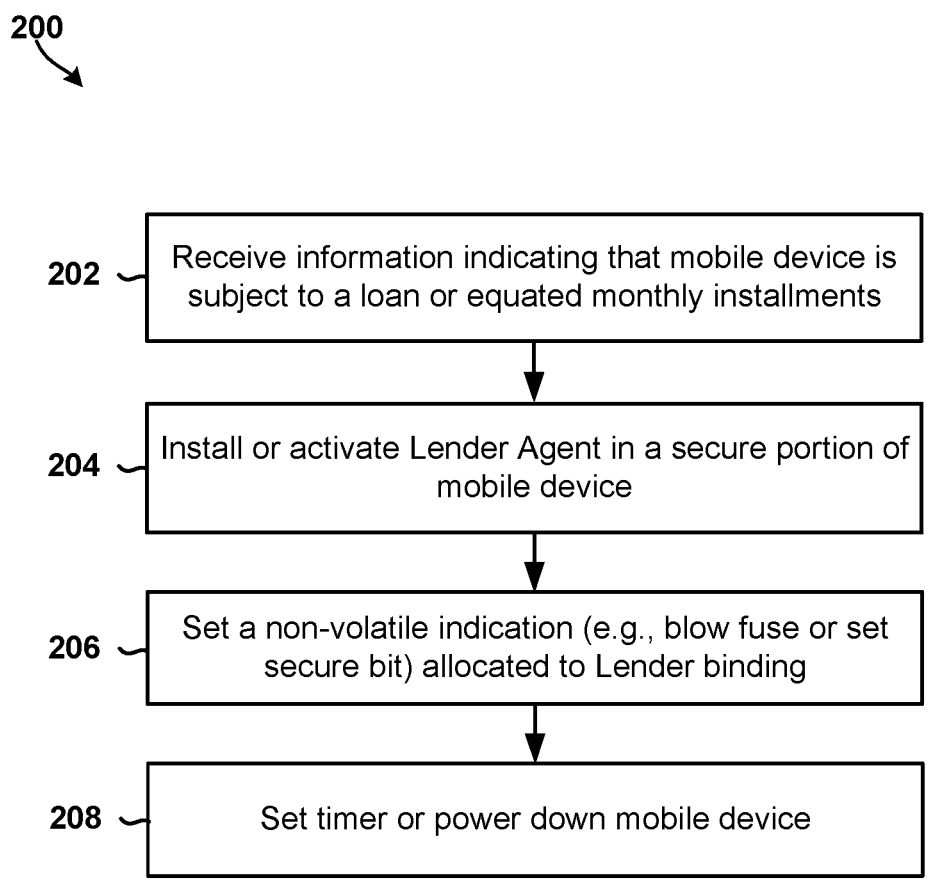
FIGS. 2A through 2D are process flow diagrams illustrating methods of implementing progressively more stringent usage restrictions on a mobile device in accordance with various embodiments.

FIG. 2A illustrates a method 200 of activating security mechanisms in a mobile device to implement progressively more stringent restrictions on the use of the mobile device in accordance with an embodiment. The method 200 may be invoked by a computing system operated by the lender of the mobile device, and the operations of the method 200 may be performed by one or more processors in the mobile device (e.g., processors 110, 112, 114, 116, 118, 152, and/or 160 or SOCs 102, 104 illustrated in FIG. 1 or 7, etc.).

In block 202, the mobile device processor may receive, such as via a modem processor 112 coupled to a transceiver 708 that received radio frequency (RF) signals from an antenna 704, information indicating that the mobile device is subject to a loan (e.g., a new loan, a transferred loan, a preexisting loan, etc.) or equated periodic installments (e.g., annual installments, bi-monthly installments, monthly installments, bi-weekly installments, weekly installments, etc.). In some embodiments, the mobile device processor may also receive a lender agent or client software application from a server of a retailer, a lender or a third party in block 202. In some embodiments, the mobile device processor may be configured or programmed to indicate that the device is subject to the loan or equated periodic installment plan as part of configuring the mobile device or sale or as part of signing up for the loan/installment plan. In some embodiments, the mobile device processor may be informed that the device is subject to the loan or equated periodic installment plan via an over-the-air update.

In block 204, the mobile device processor may install the received client or retailer/lender agent, or activate a previously installed client or retailer/lender agent, in a secure portion of mobile device. The operations in block 204 may involve any process or procedure known in the art for activating a secure procedure within a secure portion of memory and a secure operating system. For example, the mobile device processor, via an operating system operation, may set a flag, send a signal on an internal communication bus, or otherwise communicate with a secure kernel or processor to activate a client or agent software module within the a secure portion of the processor and operating system that is configured to manage loan or equated periodic installment processes. As another example, the mobile device processor may access a client or agent software module from a secure portion of memory and activate that module within a secure operating environment within the processor.

In block 206, the mobile device processor may set a non-volatile indications (e.g., blow a fuse, eFuse, QFPROM, etc. and/or set a secure bit/flag) allocated to lender binding in response to determining that the mobile device is subject to the loan. In some embodiments, the mobile device may include one or more fuses, bits or flags for each of a plurality of retailers/lenders. In some embodiments, the non-volatile indication may be one of a series of fuses, bits or flags that are collectively allocated to all retailers/lenders. The non-volatile indication may be in a secure and/or privileged portion of the mobile device processor, such as in security enabled hardware, a secure memory, a secure portion of the operating system, a secure operating system (SOS), a trusted execution environment (TEE), the kernel space of the operating system kernel, etc. Thus, the mobile device processor may set a non-volatile indication (e.g., blow a fuse or set a bit in non-volatile memory) to provide a non-volatile indication (e.g., a state) that the mobile device is subject to a loan or equated periodic installment plan so that the next time the mobile device processor is powered up (e.g., via a warm boot or a cold boot), the processor can check that one non-volatile indication to determine whether to check a payment status or operate within limitations imposed by the loan or equated periodic installment plan.

In block 208, the mobile device processor may set a timer or power down the mobile device. Having set the non-volatile indication in block 206, the mobile device may power down if no other operations are being performed. Additionally, the mobile device processor may start a timer or store a date in memory to indicate when the mobile device processor may determine whether a payment on a loan or EMI has been made.

Figure 2B:
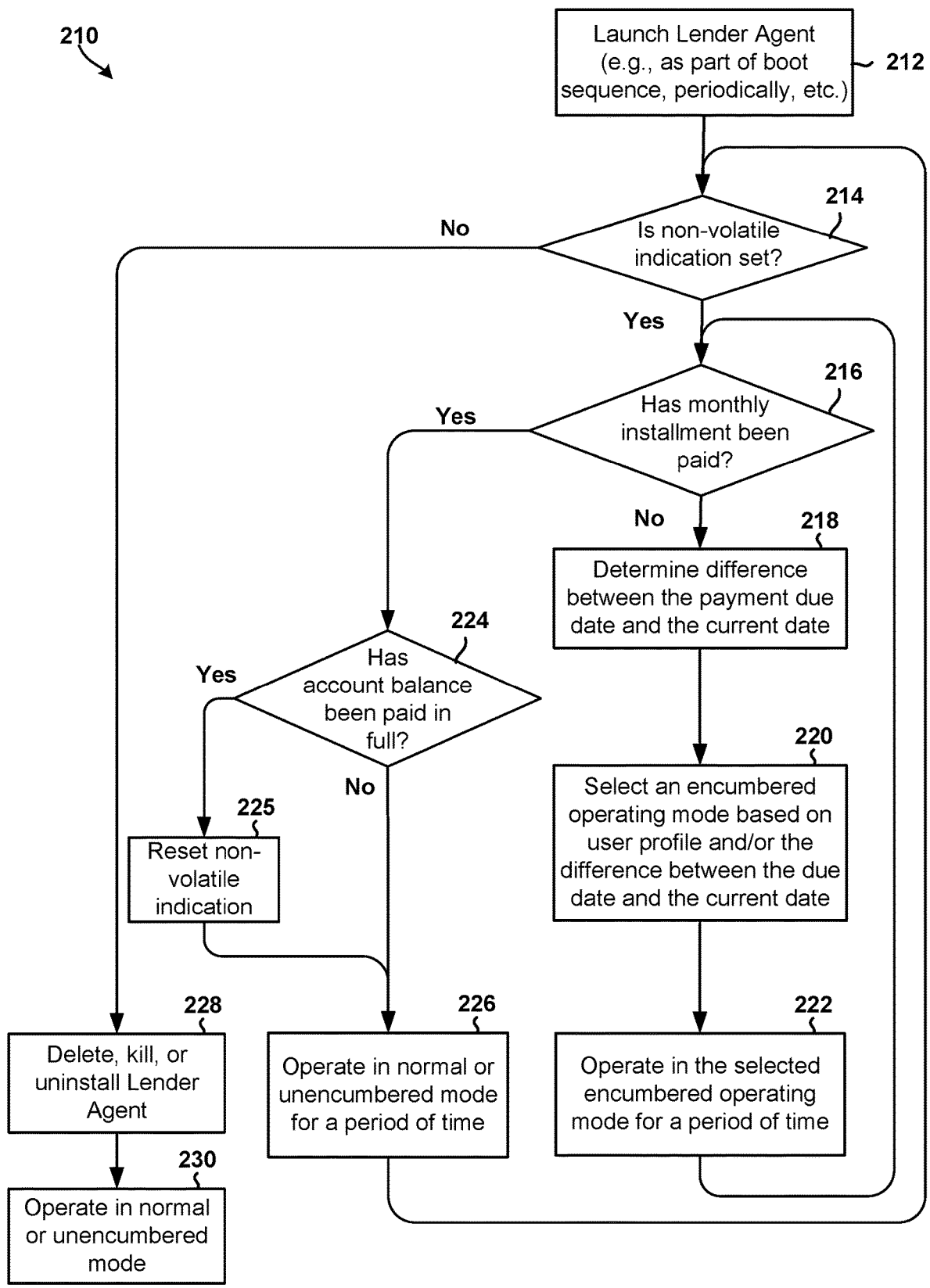

FIG. 2B illustrates a method 210 of implementing progressively more stringent restrictions in accordance with various embodiments. The method 210 may be performed by a processor in a mobile device (e.g., processors 110, 112, 114, 116, 118, 152, and/or 160 or SOCs 102, 104 illustrated in FIG. 1 or 7, etc.).

In block 212, the mobile device processor may launch the client or retailer/lender agent operating in a secure portion of mobile device. In some embodiments, the mobile device processor may launch the client or retailer/lender agent as part of a boot sequence of the processor. For example, any time a user accesses the mobile device, the mobile device processor may launch or start a thread for the client or retailer/lender agent operating in a secure portion of mobile device.

In determination block 214, the mobile device processor may determine whether a non-volatile indication (e.g., a fuse eFuse, QFPROM, etc.) allocated to lender binding has been set, as in block 206 of the method 200 as described with reference to FIG. 2A. As explained above, the non-volatile indication (e.g., fuse or secure bit/flag) may be in a secure and/or privileged portion of the mobile device processor, such as in security enabled hardware, a secure memory, a secure portion of the operating system, a secure operating system (SOS), a trusted execution environment (TEE), the kernel space of the operating system kernel, etc.

In response to determining that the non-volatile indication is not set (i.e., determination block 214="No"), the mobile device processor may deactivate the client or retailer/lender agent in block 228. Deactivating the client or retailer/lender agent may include uninstalling the client and/or agent, terminating any processes or instances of the client and/or agent executing on the mobile device, and/or otherwise disabling the functionality of the client and/or agent. In some embodiments, the operations in block 228 may not be performed, such as when such a client and/or agent is not installed, as may be the case of a mobile device that has never been subject to a loan or equated periodic installment plan. In block 230, the mobile device processor may operate in normal or unencumbered mode indefinitely or until a client or retailer/lender agent is installed, reinstalled or reactivated (e.g., when the user takes out another loan on the mobile device, etc.).

In response to determining that the non-volatile indication is set (i.e., determination block 214="Yes"), the mobile device processor may determine whether the monthly installment for the current period has been paid in determination block 216. In some embodiments, as part of or in support of this determination, the mobile device processor may request and/or receive payment and due date information via a secure communication link (e.g., established via an antenna 704 coupled to a transceiver 708 and maintained by a modem processor 112 that is coupled to the mobile device processor by an interconnection/bus 126) to a payment server or a server managed by the retailer, lender or a third-party monitoring loan payments. For example, in some embodiments, this may be accomplished by the processor sending a query message via the secure communication link to a remote server requesting the payment status (including a next payment due date) and receiving an answer from the remote server in response. As another example, in some embodiments, this may be accomplished by the processor checking information stored in secure memory of the mobile device in which is stored payment status information that is periodically received by the mobile device from a remote server via a secure communication link (e.g., established via an antenna 704 coupled to a transceiver 708 and maintained by a modem processor 112 that is coupled to the mobile device processor by an interconnection/bus 126) and stored to the memory when received.

In response to determining that the monthly installment for the current period has not been paid (i.e., determination block 216="No"), the mobile device processor may determine the difference (e.g., 24 hours, 7 days, etc.) between the payment due date and the current date in block 218. This may be performed by subtracting date values to determine the difference.

In block 220, the mobile device processor may select an encumbered operating mode based on a profile of the mobile device user and/or the difference between the due date and the current date. The following are non-limiting examples of date difference criteria and operating modes that may be selected by the processor in block 220.

If the difference between the due date and the current date is within a first period of time (e.g., between 1 and 7 days), the mobile device processor may select a first encumbered operating mode. The first encumbered operating may require that the mobile device render a payment-due reminder on the electronic display of the mobile device at a periodic interval (e.g., every day or at another periodic interval). Alternatively or in addition, the first encumbered operating may require that the mobile device render or produce a haptic, audio, and/or other visual indication every day (or at another periodic interval) to remind the user about the loan.

If the difference between the due date and the current date is within a second period of time (e.g., between 0 and 1 days, between 0 and 24 hours, etc.), the mobile device processor may select a second encumbered operating mode that requires that the mobile device display a timer indicating the amount of time (hours, minutes, seconds) remaining until the due date.

If the difference between the due date and the current date is within a third period of time (e.g., between 0 and −1 days, less than 0 but greater than negative 24 hours, or any time value that indicates that the payment is past due by less than a time period, etc.), the mobile device processor may select a third encumbered operating mode that restricts or disables a select number of applications, such as the most frequently used applications, on the mobile device. For example, during normal use, the mobile device processor may monitor the daily usage of apps on the mobile device, determine that the three most frequently used applications on the device are WHATSAPP® (average daily usage of 2 hours), GMAIL® (average daily usage of 1.5 hours), and YOUTUBE® (average daily usage of 1 hour), and update the user profile to indicate these are the most frequently used apps. When operating in the third encumbered operating mode, the mobile device processor may prevent the user from accessing WhatsApp, Gmail, or YouTube.

If the difference between the due date and the current date is within a fourth period of time (e.g., between −1 and −2 days, the payment is more than 2 days past due, etc.), the mobile device processor may select a fourth encumbered operating mode that disables cellular and WLAN capabilities of the mobile device (except for use in making or receiving emergency calls or notifications, for example), or restricts their use to communications and websites related to the retailer/lender or payment of the outstanding balance.

It should be understood that the above examples are not limiting, and any number of restrictions and encumbered operating modes may be selected and implemented based on any range of days or time periods associated with the difference between the due date and the current date. For example, instead of restricting or disabling a select number of applications until payment is received, the third encumbered operating mode (or a fifth encumbered operating mode, etc.) could restrict use of select applications during certain times of the day, prevent the user from installing new apps, slow down the speed of the processor, artificially limit the amount of available space on the device, limit audio/video capabilities of the device, limit photo/video capturing capabilities device, etc. Thus, various embodiments enable a lender to establish a cascade of reminders, and rewards to motivate users to make timely payments, while imposing varying levels of restrictions on those who do not pay promptly.

In block 222, the mobile device processor may enter and operate in the selected encumbered operating mode for a period of time (e.g., a predetermined amount of time, until a timer expires, etc.). Thus, in block 222, the mobile device processor implements the reminders, rewards, and/or restrictions determined appropriate in block 220 based on the date difference determined in block 218. The mobile device processor may continue to implement the selected mode until the next time the mobile device processor determines whether the monthly installment for the current period has been paid in determination block 216.

In response to determining that the monthly installment for the current period has been paid (i.e., determination block 216="Yes"), the mobile device processor may determine whether the account balance has been paid in full in determination block 224. In some embodiments, as part of or in support of this determination, the mobile device processor may request and/or receive payment and due date information via secure communication links (e.g., established via an antenna 704 coupled to a transceiver 708 and maintained by a modem processor 112 that is coupled to the mobile device processor by an interconnection/bus 126) to payment server or a server managed by the retailer, lender or a third-party monitoring loan payments. For example, in some embodiments, this may be accomplished by the processor sending a query message via the secure communication link to a remote server requesting the payment status and receiving an answer from the remote server in response. As another example, in some embodiments, this may be accomplished by the processor checking information stored in secure memory of the mobile device in which is stored payment status information that is periodically received by the mobile device via a secure communication link (e.g., established via an antenna 704 coupled to a transceiver 708 and maintained by a modem processor 112 that is coupled to the mobile device processor by an interconnection/bus 126) from a remote server, and stored to the secure memory when received.

In response to determining that the account balance has been paid in full (i.e., determination block 224="Yes"), the mobile device processor may reset the non-volatile indication (e.g., point to another fuse or reset a secure bit/flag) in block 225. In some embodiments, this operation may be the inverse or opposite of the operations performed in block 206 of the method 200, the mobile device processor may reset the non-volatile indication (e.g., select another fuse or reset a secure bit/flag) in a secure and/or privileged portion of the mobile device processor, such as in security enabled hardware, a secure memory, a secure portion of the operating system, a secure operating system (SOS), a trusted execution environment (TEE), the kernel space of the operating system kernel, etc.

After resetting the non-volatile indication in block 225 or in response to determining that the account balance has not been paid in full (i.e., determination block 224="No"), the mobile device processor may set a timer and operate in a normal or unencumbered mode for a period of time (e.g., until the start of the next payment period, until the timer expires, etc.) in block 226. In some embodiments, the operations in block 226 may include comparing a current date to a date stored in memory for the next payment due date. After the timer expires or when the current date matches the payment due date stored in memory, the mobile device processor may again determine whether the non-volatile indication is set in determination block 214 as described above.

Non-Volatile Indication is Set

Figure 2C:
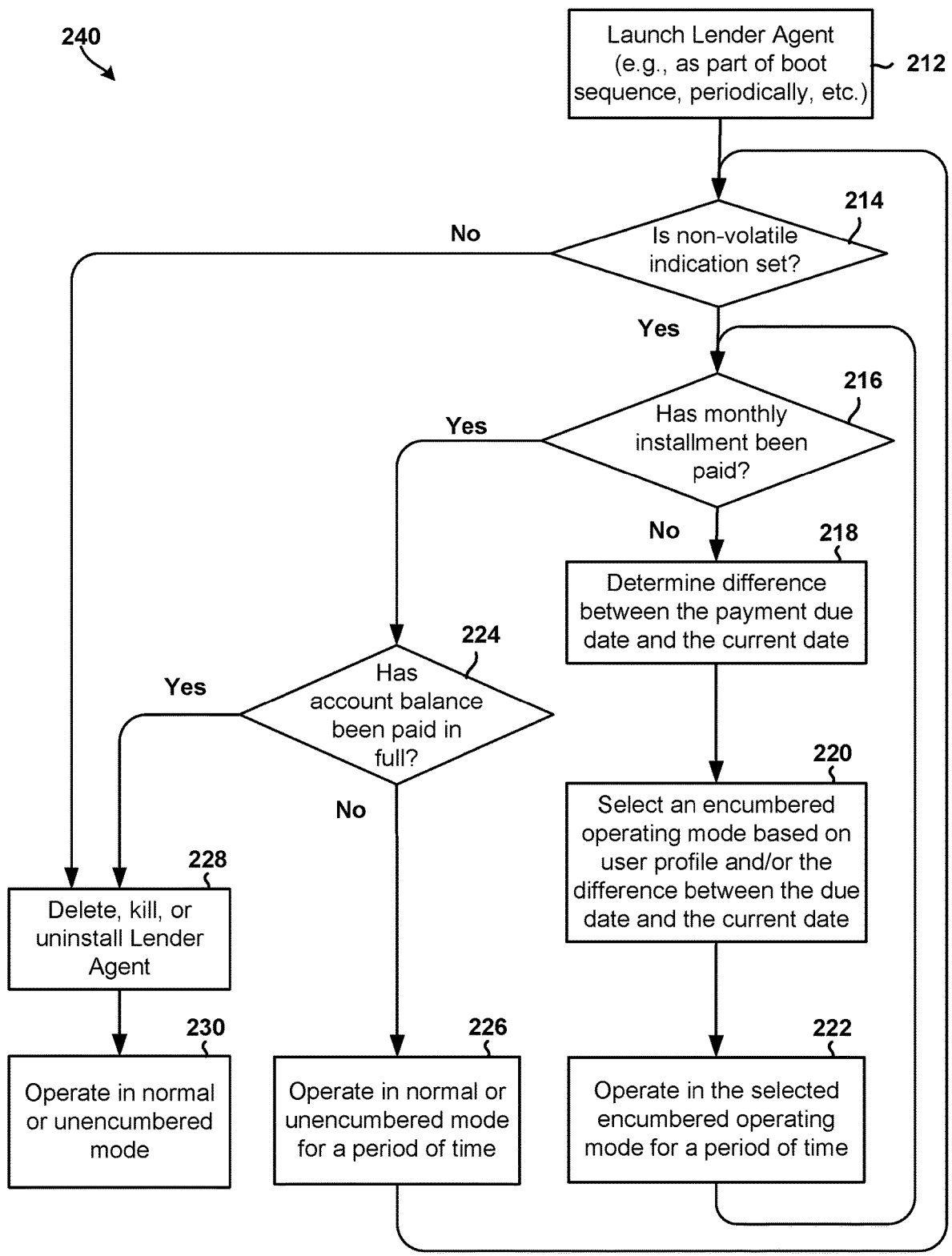
Figure 2D:
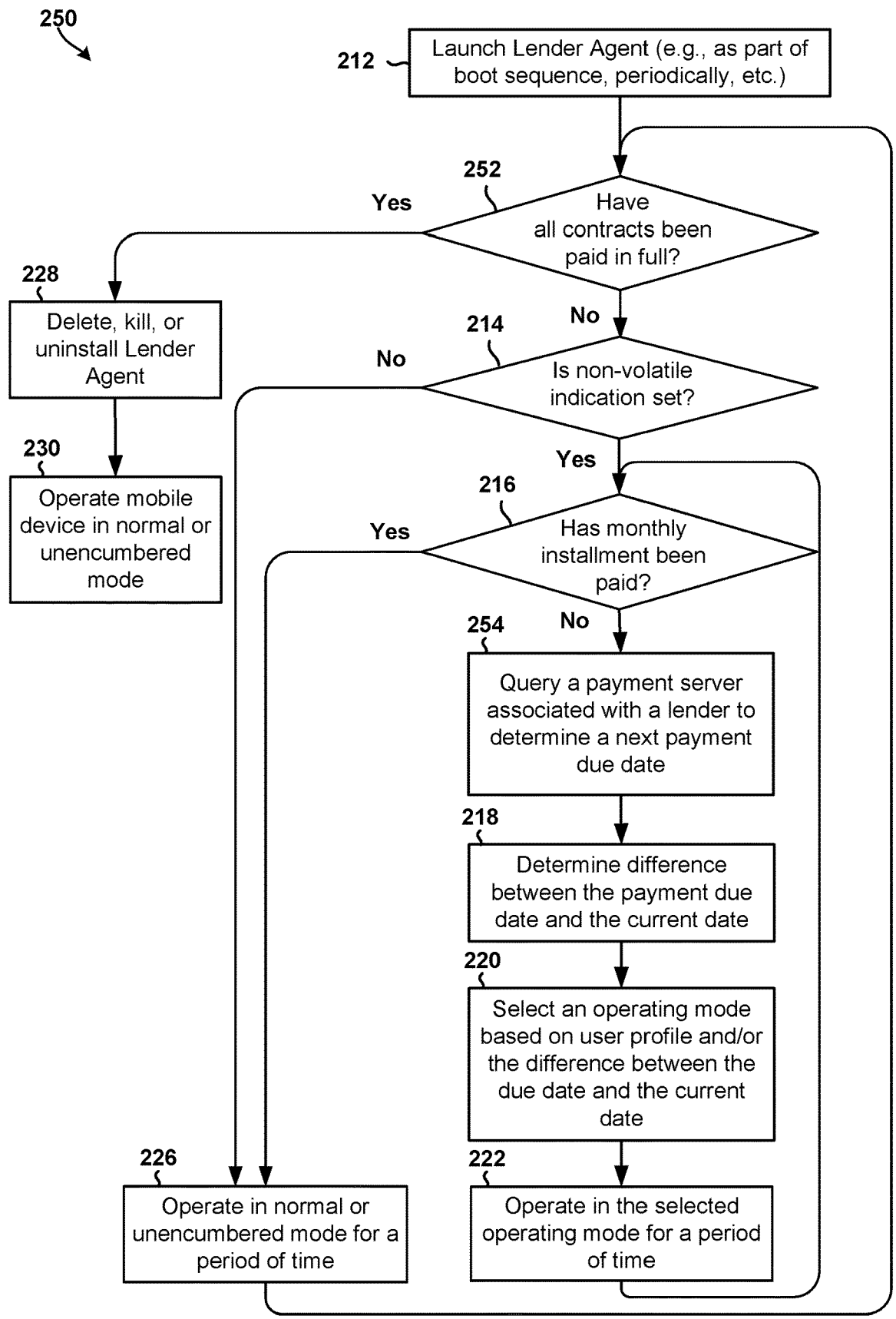

FIGS. 2C and 2D illustrates methods 240, 250 of implementing progressively more stringent restrictions in which a single non-volatile indication is used for each contract, loan or EMI.

Figure 7:
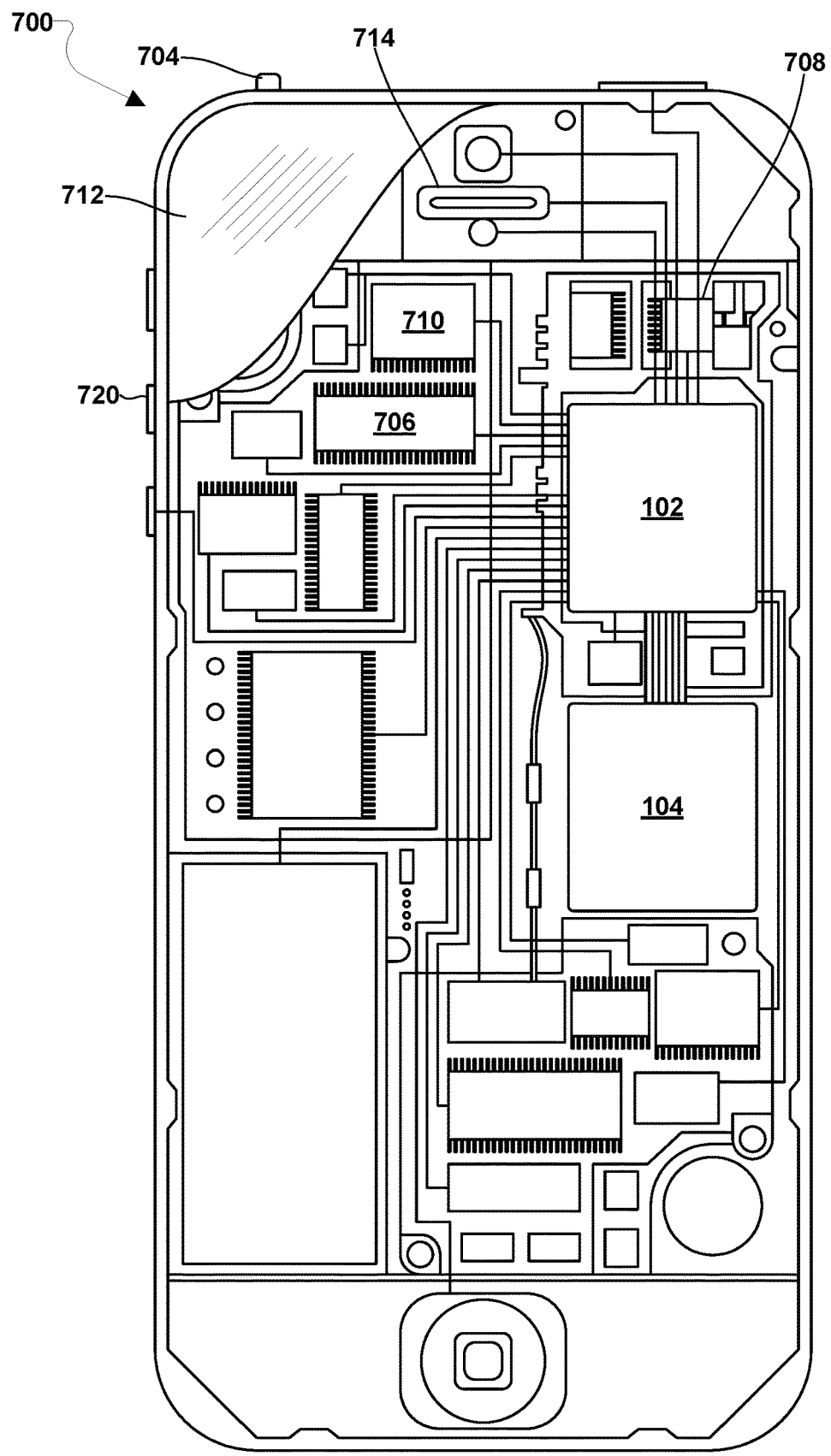
FIG. 7 is a component block diagram of mobile device suitable for implementing the various embodiments.

With reference to FIGS. 1-2C, the operations of the method 240 may be performed by one or more processors in the mobile device (e.g., processors 110, 112, 114, 116, 118, 152, and/or 160 or SOCs 102, 104 illustrated in FIG. 1 or 7, etc.). The method 240 is similar to the method 210 describe with reference to FIG. 2B, except that in response to determining that the account balance has been paid in full (i.e., determination block 224="Yes"), the mobile device processor deactivates the client or retailer/lender agent in block 228.

With reference to FIGS. 1-2D, the operations of the method 250 illustrated in FIG. 2D may be performed by one or more processors in the mobile device (e.g., processors 110, 112, 114, 116, 118, 152, and/or 160 or SOCs 102, 104 illustrated in FIG. 1 or 7, etc.). The method 250 is also similar to the method 210 described with reference to FIG. 2B, except that after the mobile device processor launches the client or retailer/lender agent in block 212, the processor determines whether all contracts for loans or EMIs have been paid in full in determination block 252.

In response to determining that the all contracts for loans or EMIs have been paid in full (i.e., in determination block 252="Yes"), the mobile device processor may deactivate the client or retailer/lender agent in block 228. In some embodiments, the mobile device processor may delete the client or retailer/lender agent software modules from memory in block 228. In some embodiments, the mobile device processor may delete or change a memory reference or pointer to the client or retailer/lender agent software modules in memory in block 228 so that the modules no longer execute, although the modules could be reinitiated by changing the reference or pointer. Other methods of deactivating the client or retailer/lender agent software modules may be implemented in block 228.

In response to determining that the monthly installment for the current period has been paid (i.e., determination block 216="Yes"), the mobile device processor may operate in a normal or unencumbered mode for a period of time (e.g., until the current date equals the date stored in memory for the start of the next payment period, until a timer expires, etc.) in block 226. After the time period, the mobile device processor may again determine whether all contracts for loans or EMIs have been paid in full in determination block 252.

In addition, in the method 250 illustrated in FIG. 2D, the mobile device processor may send a query via a secure communication link (e.g., established via an antenna 704 coupled to a transceiver 708 and maintained by a modem processor 112 that is coupled to the mobile device processor by an interconnection/bus 126) to a payment server associated with a lender of the mobile device to determine a next payment due date in block 254 in response to determining that the non-volatile indication allocated to lender binding has been set (i.e., determination block 214="Yes") and/or in response to determining that the monthly installment has not been paid (i.e., determination block 216="No"). In some embodiments, querying the payment server associated with the lender of the mobile device to determine the next payment due date may include the mobile device processor determining whether an account balance has been paid in full based on information received from the payment server, and resetting the non-volatile indication allocated to lender binding in response to determining that the account balance has been paid in full. In some embodiments, the non-volatile indication may be a fuse and resetting the non-volatile indication may include the mobile device processor incrementing a counter or pointer to point to the next fuse in an array of fuses so that the next time the mobile device processor checks to determine whether the fuse is blown (e.g., in determination block 214), the mobile device processor determines that the fuse is not blown.

Figure 3:
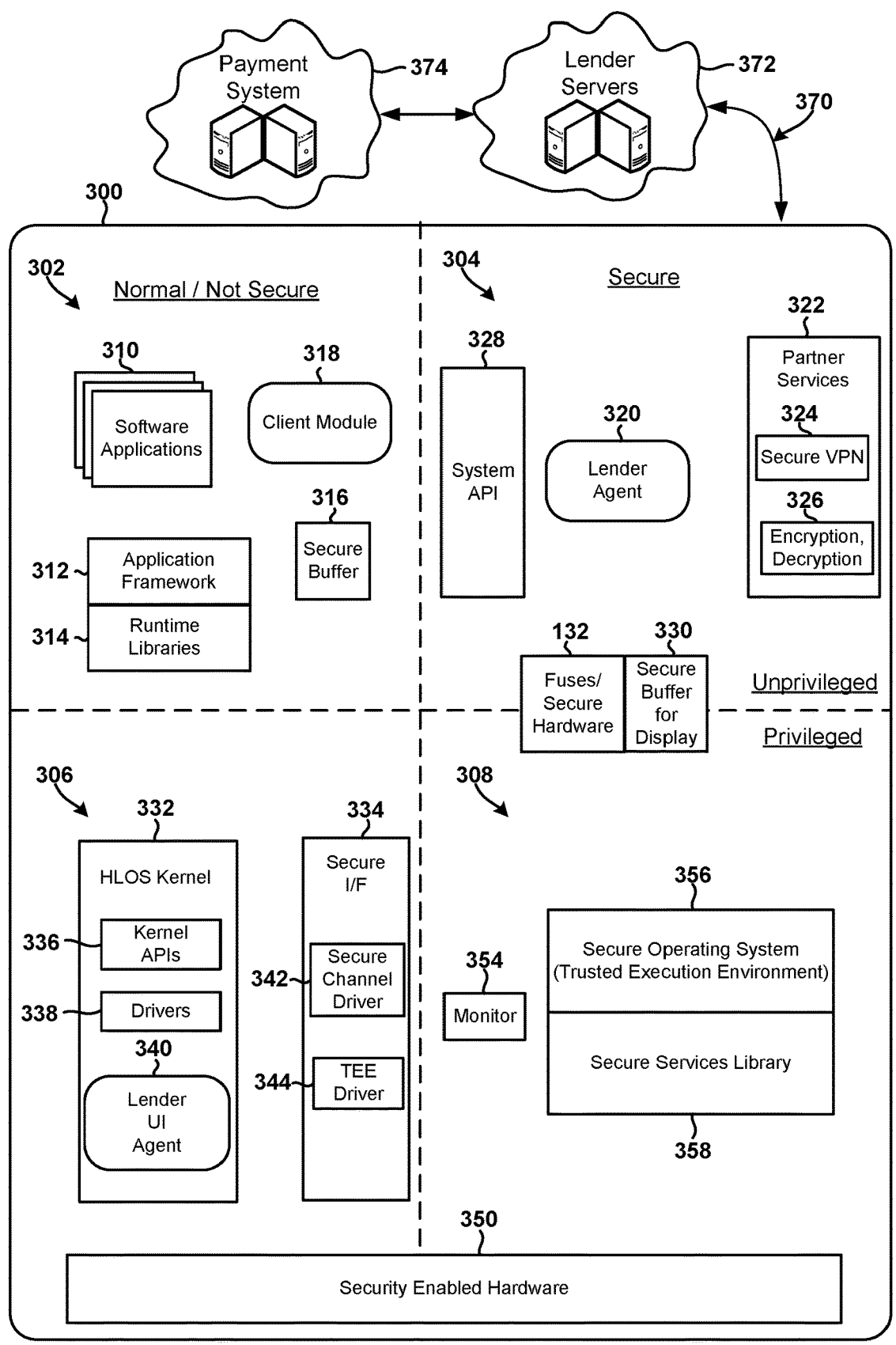
FIG. 3 is block diagram illustrating example logical and functional components in a mobile device that includes secure and non-secure protection domains suitable for implementing some embodiments.

FIG. 3 illustrates example logical and functional components in a mobile device 300 configured to securely allow a lender to implement progressively more stringent restrictions in accordance with some embodiments, including the embodiments described with reference to FIGS. 1-2D.

In the example illustrated in FIG. 3, the mobile device 300 includes a secure computing environment that includes security enabled hardware 350 and software divided into four protection domains/portions, namely an unprivileged-normal portion 302, an unprivileged-secure portion 304, a privileged-normal portion 306, and a privileged-secure portion 308. The unprivileged portions may be within the user space of the operating system kernel, whereas the privileged portions may be within the kernel space of the operating system kernel. Both the user space and the kernel space may each include a secure portion and a non-secure portion.

The unprivileged-normal portion 302 may include software applications 310, an application framework 312, run-time libraries 314, a secure buffer 316, and a client 318 module. The secure buffer 316 may be configured to enable communication between various logical components and across protection domains/portions. In an embodiment, the secure buffer 316 may be configured so that any functional component 310-358 in any protection domain/portion 302-308 may write to its memory, but only functional components 320-328 and 354-358 in the secure portions 304, 308 may read the information stored in the memory. For example, the secure buffer 316 may be configured so that the software applications 310, client 318, retailer/lender user-interface (UI) agent 340, lender agent 320, and partner services 322 functional components may write to its memory, but only the lender agent 320 and the partner services 322 functional components may read from its memory.

The unprivileged-secure portion 304 may include a system application programming interface (API) 328, a lender agent 320, and a partner services 322 functional component that includes a secure virtual private network (VPN) 324 functional component and an encryption/decryption 326 functional component. In an embodiment, the unprivileged-secure portion 404 may also include non-volatile indications (e.g., fuses) and security hardware 132 (described above with reference to FIG. 1) and a secure buffer for display 330. The secure buffer for display 330 may be suitable for communicating security-encrypted information generated in the unprivileged-secure portion 304 to an electronic display or display subsystem of the mobile device 300.

The privileged-normal portion 306 may include core elements of a high level operating system (HLOS) kernel 332 and secure infrastructure (I/F) 334. The HLOS kernel 332 may include a kernel API 336 and drivers 338. The secure infrastructure 334 may include a secure channel driver 342, and a secure operating system or trusted execution environment (TEE) driver 344.

The privileged-secure portion 308 may include a monitor 354, a secure block system (SBS) or trusted execution environment (TEE) 356, and a secure services library 358. In an embodiment, the privileged-secure portion 308 may also include a secure buffer for display 330 and non-volatile indications (e.g. fuses) and security hardware 132 (described above with reference to FIG. 1).

In an embodiment, the mobile device 300 may further include a secure file system (not illustrated) suitable for long term and secured storage of data and behavior models. In an embodiment, the secure file system may be configured to store longer term data in encrypted form. In an embodiment, the secure file system may be configured to store encryption/decryption keys, payment information, EMI contract information, policy information, software installation information, software deactivation information, etc.

The mobile device 300 may also include a secure communication links 370 suitable for communicating with a network server or cloud computing system 372, which may include lender servers that are configured to communicate with a payment system 374. The communication links 370 may be configured to support sending and receiving keys, verification information, operating mode information, payment information, etc. to and from an external server of the retailer/lender, which may be achieved in the unprivileged-secure portion 304 via the partner services 322 and/or lender agent 320 functional components. For example, the secure VPN 324 functional component may receive encrypted payment information from a network server, the encryption/decryption 326 may decrypt the received payment information in the unprivileged-secure portion 304 and provide the decrypted payment information to the lender agent 320, which may further process the information and send payment status information to the client 318 in the unprivileged-normal portion 302.

FIGS. 4A-4E illustrate mobile device logical components and information flows for different example embodiments for implementing progressively more stringent usage restrictions in secure computing environments, including the embodiments discussed above with reference to FIGS. 1-3.

Figure 4A:
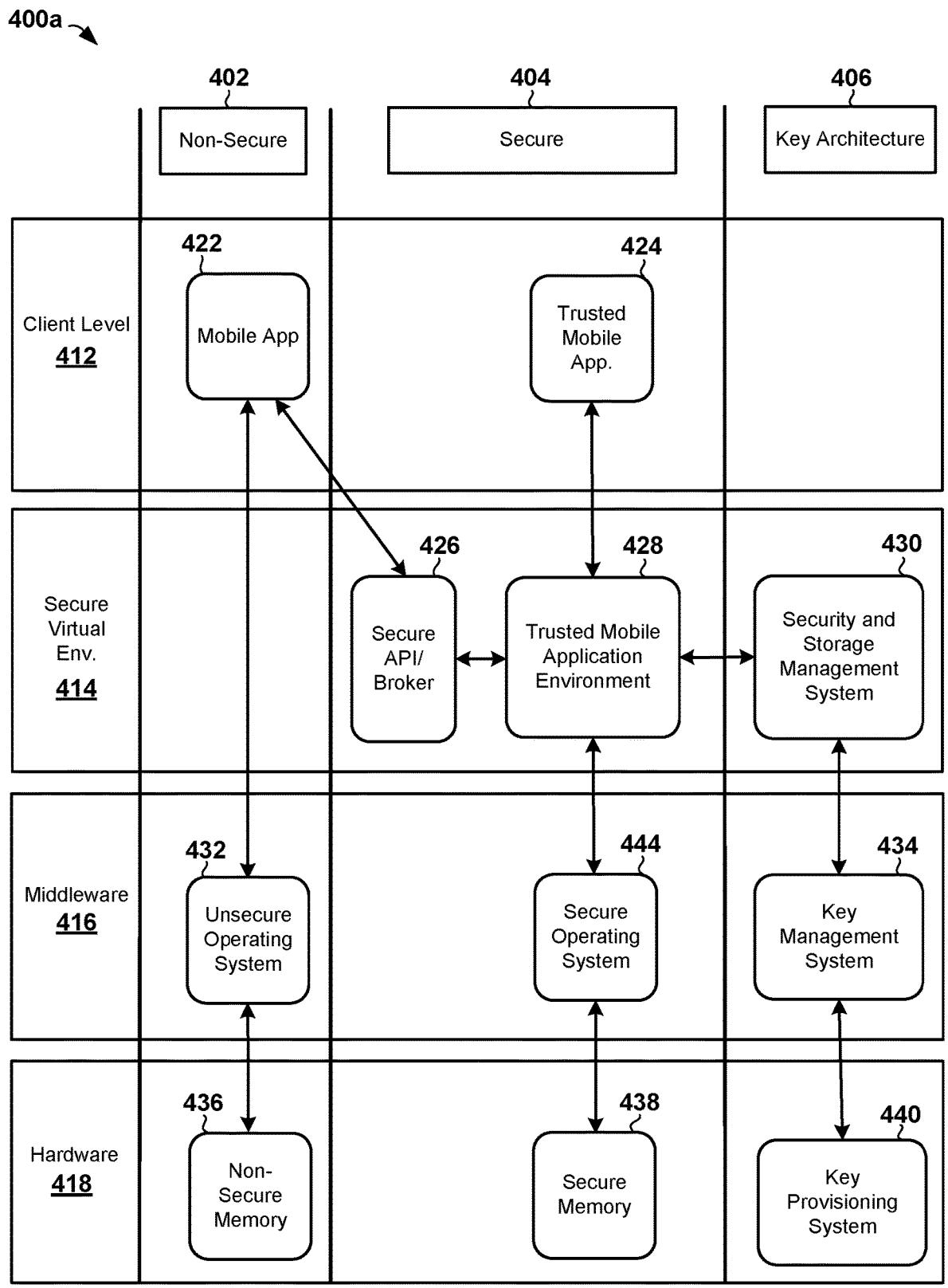
FIGS. 4A through 4E are block diagrams that illustrate example logical components and information flows in secure computing environments that could be included in a mobile device and used to implement progressively more stringent usage restrictions in accordance with some embodiments.

Referring to FIG. 4A, the overall system architecture 400a may include three areas; a non-secure area 402, a secure area 404, and a key architecture 406. The non-secure area 402 represents unprotected areas in which security protocols are not applied, the secure area 404 represents protected areas in which security protocols are applied, and the key architecture area 406 represents the areas in which mobile device security keys operate. The non-secure area 402 includes a mobile application 422, a normal or unsecure operating system 432, and non-secure memory 436. The secure area 404 includes a trusted mobile application 424, a secure API/broker 426, a trusted mobile application environment 428, a secure operating system 444, and a secure memory 438. The key architecture 406 includes a security and storage management system 430, a key management system 434, and a key provisioning system 440.

The software levels of the system 400a may be broken down into a client level 412, a secure virtual environment 414, a middleware level 416, and a hardware level 418. Client level 412 software may include general mobile device software applications 422 and trusted mobile applications 424, which may be pre-authorized software provided by a third party (e.g., retailer) that is identified as complying with specific security and/or operability requirements.

The secure virtual area 414 may be a software level or run time environment established on a mobile device. The secure virtual environment 414 may contain a secure API/broker 426 that may act as a gate keeper for the secure virtual environment 414. For example, a user may attempt to access or modify the mobile application 422 stored in a non-secure area. In response, the secure API/broker 426 may determine whether the mobile application 422 (or its access/modification by the user) meets the security and operability requirements of secure virtual environment 414. If so, the secure API/broker 426 may allow the mobile application 422 to operate in the secure virtual environment 414, and may relay relevant information to and from the trusted mobile application environment 428, which is an area of the secure virtual environment 414 in which the authorized applications operate. The mobile application 422 may be restricted from further interactions with the secure virtual environment 414 if it ceases to meet the requirements of the secure API/broker 426.

The secure virtual environment 414 may include a security and storage management system 430 that interacts with the trusted mobile application environment 428 and the key management system 434 to provide necessary security and storage capability.

An unsecure operating system 432 may be provided on the mobile device in a non-secure area 402, and a non-secure memory 436 may be provided in a non-secure area 402. A mobile application 422 that does not meet the requirements of the secure API/broker 426 may only operate in the unsecure operating system 432 and may only write or read data to the non-secure memory 436.

Provided in the secure area 404 of the mobile device may be a secure operating system 444 and a secure memory 438. Trusted mobile applications 424 may be provided to the trusted mobile application environment 428. Trusted mobile applications 424 may be provided to the secure operating system 444 through the trusted mobile application environment 428. Only applications in the trusted mobile application environment 428 may interact with the secure operating system 444 and the secure memory 438. In the embodiment illustrated in FIG. 4A, the non-secure memory 436, the secure memory 438 and the key provisioning system 440 reside at the hardware level 418.

Figure 4B:
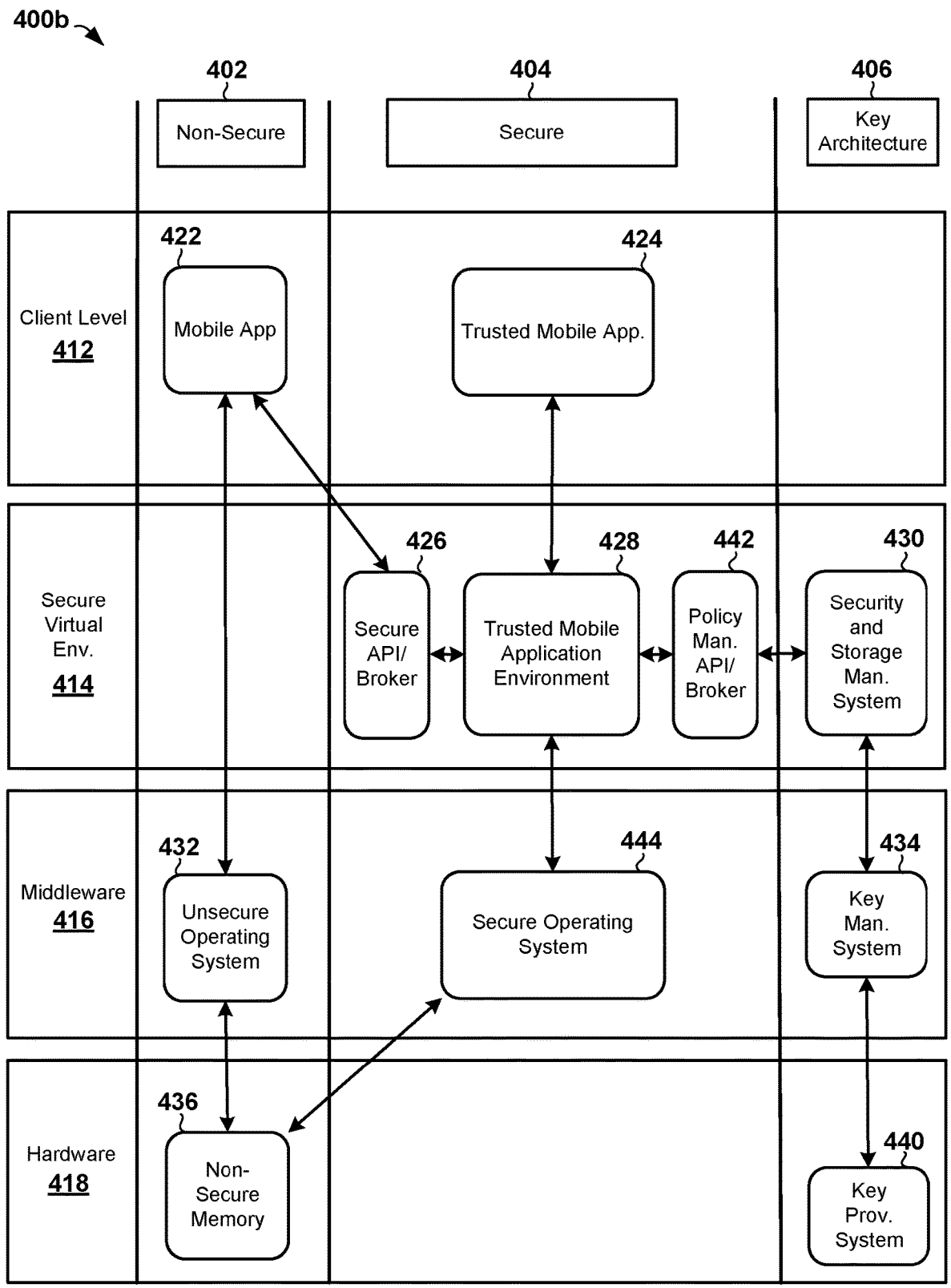

FIG. 4B illustrates another embodiment architecture 400b that includes functional components similar to those described with reference to FIG. 4A, and includes a policy manger broker 442 and a single memory 436 on the mobile device. In this embodiment, the secure operating system 444 and the unsecure operating system 432 both store and read data on the non-secure memory 436. Data in the secure virtual environment 414 may be stored in an encrypted form when not in use by the trusted mobile application environment 428. The continual application of encryption at the data level by the secure virtual environment 414 ensures that secure data may be stored in a non-secure memory 436 because the secure data itself will be encrypted at the data level.

Figure 4C:
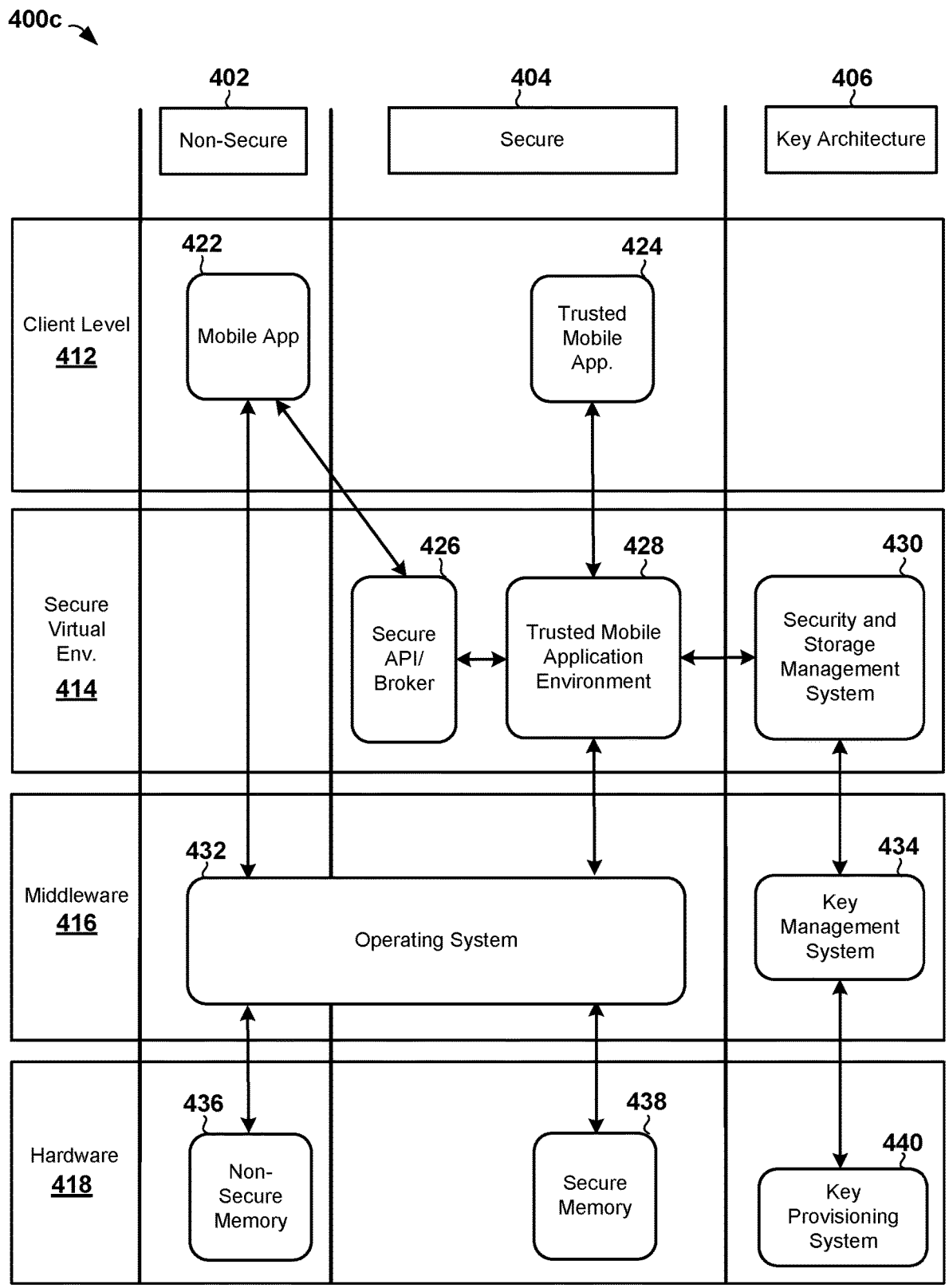
Figure 4D:
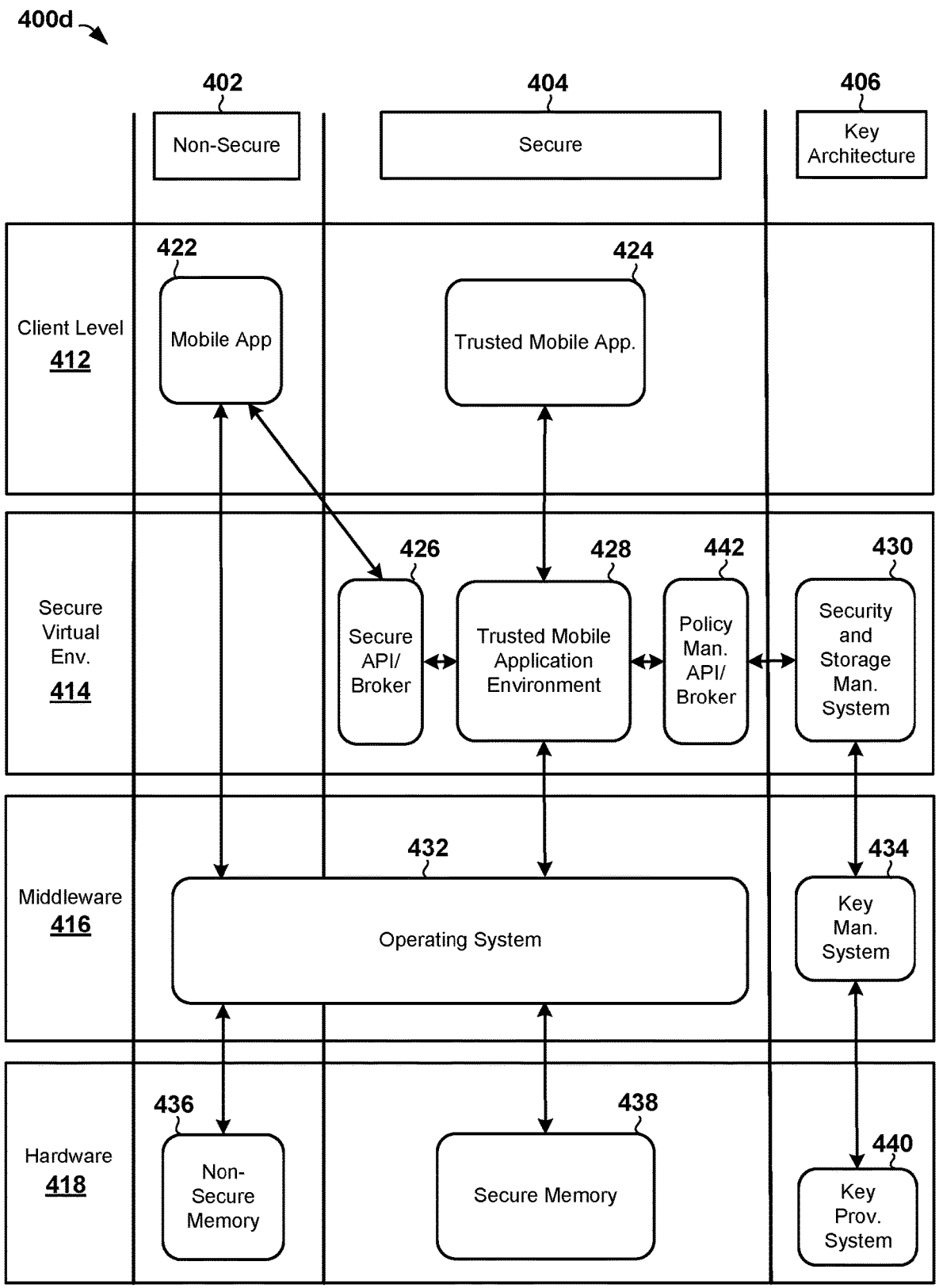
Figure 4E:
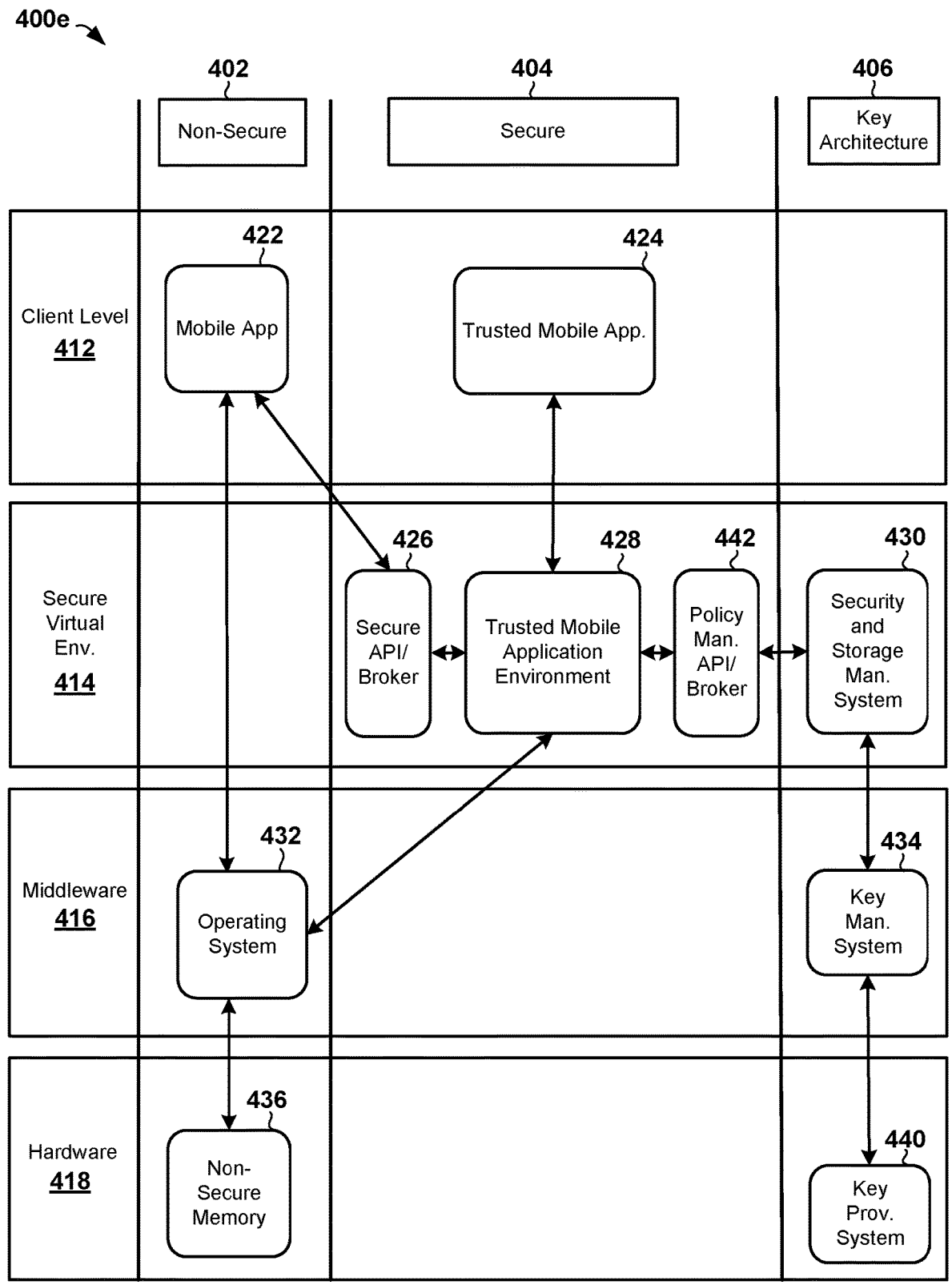

FIGS. 4C-4E illustrate alternative embodiments of a secure virtual environment in which a mobile device is configured with a single operating system.

Referring to FIG. 4C, the overall system architecture 400c is similar to the embodiment discussed above with reference to FIG. 4A, but the operating system 432 is included in both the secure area 404 and non-secure area 402. The operating system 432 may interact with the secure virtual environment 432 through the trusted mobile application environment 428 and mobile applications 422 in a non-secure area 402. The operating system 432 may be configured such that a mobile application 422 that does not meet the requirements of the secure API/broker 426 may only function in a non-secure area 402 of the operating system 432 and may only write or read data to the non-secure memory 436. The operating system 432 may also operate in the secure area 404 of the mobile device and read and write data to a secure memory 438.

Trusted mobile applications 424, and mobile applications 422 that meet the requirements of the secure API/broker 426, may be provided to the operating system 444 through the trusted mobile application environment 428. Only applications in the trusted mobile application environment 428 interact with the secure memory 438 through the operating system 432.

FIG. 4D illustrates another embodiment system architecture 400d that includes functional components similar to those described above with reference to FIGS. 4B and 4C, with a single operating system 432 and a policy manager broker 442. The policy manager broker 442 may be in communication with the security and storage management system 430 and the trusted mobile application environment 428. Through either the trusted mobile application environment 428, or the security and storage management system 430, the policy manager broker 442 may receive policy updates from a retailer, lender or corporate entity.

The policy manager broker 442 may enable the lender to update security protocols, update operating restrictions, and perform various functions in the secure virtual environment 414 and the secure area 404 of the mobile device. The policy manager broker 442 may provide the lender with the ability to remotely update and control the trusted mobile application 424, secure virtual environment 414, and/or secure area 404 of the mobile device.

FIG. 4E illustrates another embodiment of the system architecture 400e that includes functional components similar to those described above with respect to FIG. 4D, but with a single memory 436 on the mobile device. Additionally, in this embodiment the operating system 432 resides entirely in the non-secure area 402. In this embodiment data from the trusted mobile application environment 428 and all other data passes to a single non-secure memory 436. Data in the secure virtual environment 414 may be stored in an encrypted form when not in use by the trusted mobile application environment 428. The continual application of encryption at the data level by the secure virtual environment 414 ensures that secure data may be stored in a non-secure memory 436 because the secure data itself will be encrypted at the data level.

Figure 5:
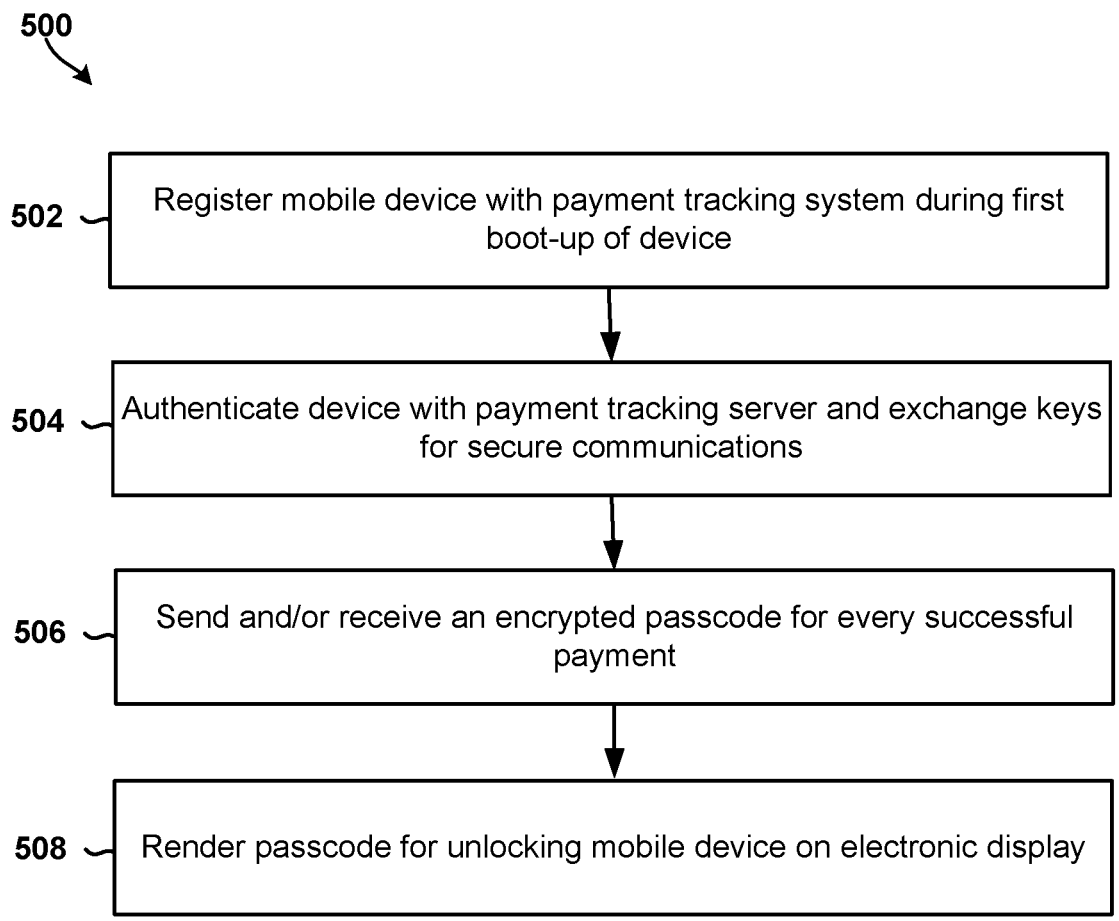
FIGS. 5 and 6 are process flow diagrams illustrating methods of implementing usage restrictions on a mobile device in accordance with some embodiments.

FIG. 5 illustrates a method 500 of configuring a mobile device to implement progressively more stringent restrictions on the use of the mobile device in accordance with some embodiments, including any or all of the embodiments described with reference to FIGS. 1-4E. With reference to FIGS. 1-5, the method 500 may be performed by a processor in a mobile device (e.g., processors 110, 112, 114, 116, 118, 152, and/or 160 or SOCs 102, 104 illustrated in FIG. 1 or 7, etc.).

In block 502, the mobile device processor may register with a payment tracking system during the first boot up after the non-volatile indication is set or the secure bit/flag is set. The payment tracking system may be operated by a third party or the lender of the mobile device. For example, as part of a boot up routine (or triggered by the boot up routine) the mobile device processor may cause a modem processor 112 to control a transceiver 708 to send RF signals via an antenna 704 to establish a secure wireless communication link with a wireless communication network, and then send messages to the payment tracking system via a network (e.g., the Internet) via the wireless communication network.

Once a secure wireless communication link is established by the modem processor, the mobile device processor may perform various authentication operations via the secure communication link to authenticate itself with the payment tracking system, and exchange various keys (e.g., authentication keys, Public Key Infrastructure (PKI) keys, public/private keys, etc.) for secure communications with the payment tracking system in block 504. Such authentication operations enable the payment tracking system to confirm the identity of the mobile device.

In block 506, the payment tracking system may send to the mobile device via the secure communication link an encrypted passcode for every successful payment, and the mobile device processor may save each passcode in secure memory.

In block 508, the mobile device processor may use the passcode recalled from memory for unlocking the mobile device on its electronic display. The operations in block 508 may be performed by secure code or an application executing in a secure portion of the operating system to enable normal operations of the mobile device by a user. For example, the mobile device processor may compare the secure code to a lock code stored in secure memory, and in response to a match, enable execution of the normal operating software of the mobile device. As another example, the mobile device processor may use the secure code to decrypt normal operating software otherwise stored in memory in encrypted form.

Figure 6:
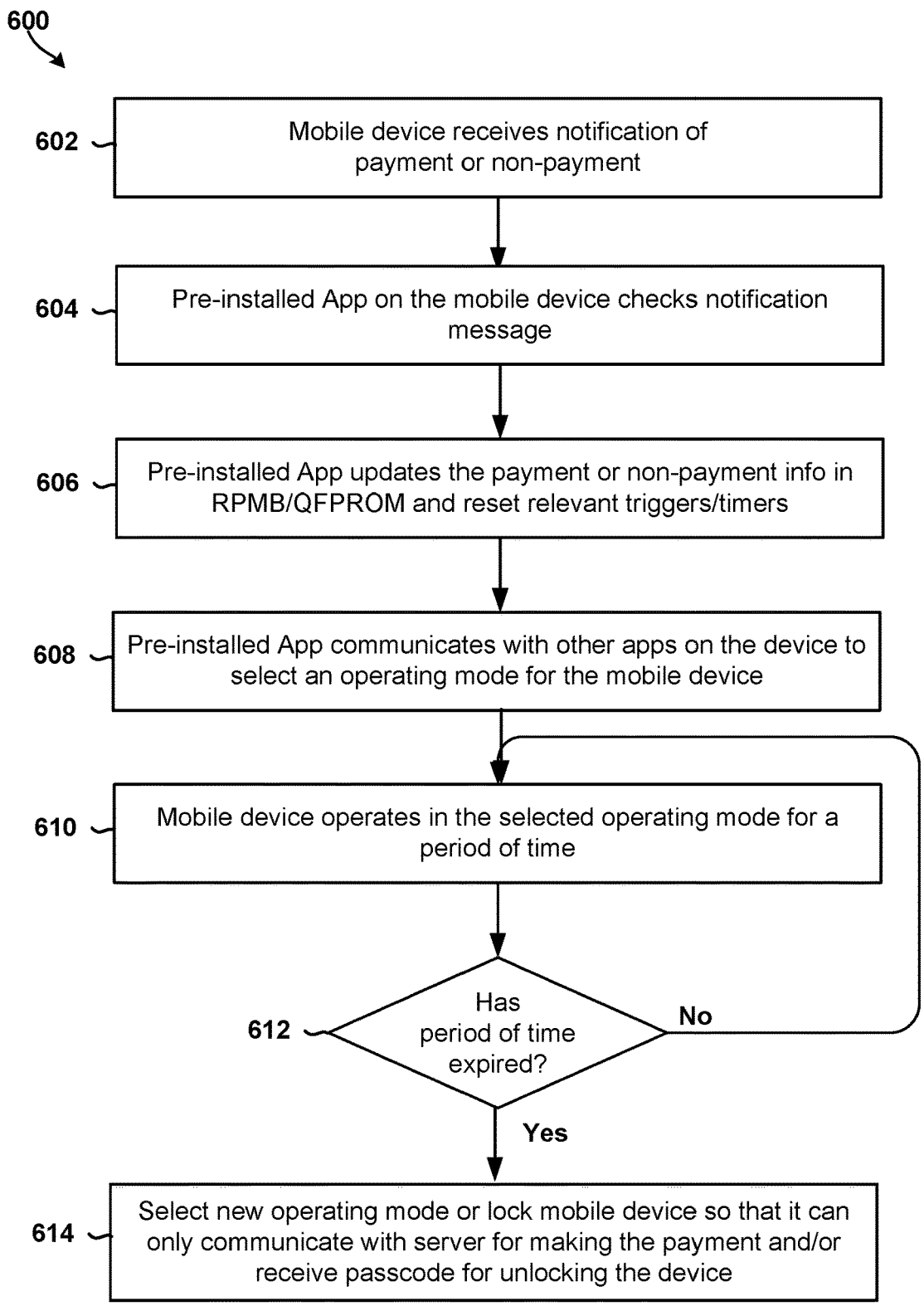

FIG. 6 illustrates a method 600 of implementing progressively more stringent restrictions on the use of the mobile device in accordance with some embodiments, including any or all of the embodiments discussed above with reference to FIGS. 1-5. With reference to FIGS. 1-6, the method 210 may be performed by a processor in a mobile device (e.g., processors 110, 112, 114, 116, 118, 152, and/or 160 or SOCs 102, 104 illustrated in FIG. 1 or 7, etc.).

In block 602, the mobile device may receive a notification of payment or non-payment from a payment tracking system. For example, the mobile device processor may periodically cause a modem processor 112 to control a transceiver 708 to send RF signals via an antenna 704 to establish a secure wireless communication link with a wireless communication network, and then query the payment tracking system via a network (e.g., the Internet) via the wireless communication network for notifications, and receive such notifications in response. As another example, the payment tracking system may send a message to the mobile device via a wireless communication link, such as via a simple message system, that prompts the mobile device processor to establish a secure wireless communication link with the payment tracking system (e.g., via the modem processor 112 using the transceiver 708 to send RF signals via the antenna 704 to establish a secure wireless communication link with a wireless communication network) to receive notifications of payment or non-payment. Other messaging mechanisms (e.g., messages via a control channel of the wireless communication network) may be used for providing the notifications of payment or non-payment to the mobile device.

In block 604, a pre-installed app (e.g., lender agent 320, etc.) in a secure area of the mobile device may check the notification message. For example, a pre-installed secure process or thread operating within a secure operating zone of the mobile device processor may parse the notification message to determine whether the notification includes information regarding a payment or a non-payment.

In block 606, the pre-installed app executing on the mobile device processor may update non-payment info stored in secure memory (e.g., RPMB/QFPROM, etc.) and reset the relevant triggers or timers. The payment/non-payment information may be written in a secured memory of the mobile device, such as the secure buffer 316 illustrated in FIG. 3, that the mobile device user cannot overwrite or modify.

In block 608, the mobile device processor may use the non-payment information to select an operating mode to enter for a period of time. In some embodiments, this may be accomplished by the pre-installed app (e.g., lender agent 320, etc.) operating in the secure area of the mobile device communicating with one or more software applications (e.g., client 318, retailer/lender UI agent 340, etc.) operating in a non-secure area of the mobile device. Various alternative operating modes may be stored in secure memory, and the pre-installed app may select one of those operating mode based on received non-payment information, and use information in the stored operating mode to control operations of the mobile device.

In block 610, the mobile device processor may operate in the selected operating mode for a period of time. For example, once the pre-installed app causes the mobile device processor to begin executing according to the selected operating mode, the process may continue to operate in this mode for the period of time. The period of time may be a set amount of time (e.g., a day, a week, a month, etc.) or until the current date matches a date stored in memory (e.g., the date that payments are next due, a day of the week, a day of the month, etc.)

In determination block 612, the mobile device processor may determine whether the period of time has expired. For example, the mobile device processor may determine whether the current date matches a date stored in memory (e.g., the date that payments are next due, a day of the week, a day of the month, etc.)

In response to determining that the period of time has not expired (i.e., determination block 612="No"), the mobile device processor may continue to operate in the selected operating mode in block 610.

In response to determining that the period of time has expired (i.e., determination block 612="Yes"), the pre-installed app executing on the mobile device processor may cause the device to enter a new operating mode and/or lock the mobile device in block 614 so that the mobile device may only communicate with the payment server to make payments and/or to receive a passcode for unlocking the device from the user or payment tracking system.

The various aspects may be implemented on a variety of mobile devices, an example of which in the form of a smartphone is illustrated in FIG. 7. A smartphone 700 may include a first SOC 102 (e.g., a SOC-CPU) coupled to a second SOC 104 (e.g., a 5G capable SOC). The first and second SOCs 102, 104 may be coupled to internal memory 706, a display 712, and to a speaker 714. Additionally, the smartphone 700 may include an antenna 704 for sending and receiving electromagnetic radiation that may be connected to a wireless data link and/or cellular telephone transceiver 708 coupled to one or more processors in the first and/or second SOCs 102, 104. Smartphones 700 typically also include menu selection buttons or rocker switches 720 for receiving user inputs.

A typical smartphone 700 also includes a sound encoding/decoding (CODEC) circuit 710, which digitizes sound received from a microphone into data packets suitable for wireless transmission and decodes received sound data packets to generate analog signals that are provided to the speaker to generate sound. Also, one or more of the processors in the first and second SOCs 102, 104, wireless transceiver 708 and CODEC 710 may include a digital signal processor (DSP) circuit (not shown separately).

The processors may be any programmable microprocessor, microcomputer or multiple processor chip or chips that may be configured by software instructions (applications) to perform a variety of functions, including the functions of the various embodiments described in this application. In some mobile devices, multiple processors may be provided, such as one processor dedicated to wireless communication functions and one processor dedicated to running other applications. Typically, software applications may be stored in the internal memory 706 before they are accessed and loaded into the processor. The processor may include internal memory sufficient to store the application software instructions.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods may be substituted for or combined with one or more operations of the methods.

The foregoing method descriptions and the process flow diagrams are provided merely as illustrative examples and are not intended to require or imply that the operations of various embodiments may be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, functional components, functionality components, circuits, and algorithm operations described in connection with the embodiments disclosed herein may be implemented as electronic hardware, computer software, or combinations of both. To clearly illustrate this interchangeability of hardware and software, various illustrative components, blocks, functional components, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement the various illustrative logics, logical blocks, functional components, and circuits described in connection with the embodiments disclosed herein may be implemented or performed with a general purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable medium or a non-transitory processor-readable medium. The operations of a method or algorithm disclosed herein may be embodied in a processor-executable software module that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments and implementations without departing from the scope of the claims. Thus, the present disclosure is not intended to be limited to the embodiments and implementations described herein, but is to be accorded the widest scope consistent with the following claims and the principles and novel features disclosed herein.

What is claimed is:

1. A method of operating a mobile device, comprising:
   determining, by a processor in a secure portion of the mobile device, whether a non-volatile indication allocated to lender binding has been set;
   querying, by the processor, a payment server associated with a lender of the mobile device to determine a next payment due date in response to determining that the non-volatile indication allocated to lender binding has been set;
   monitoring daily usage of software applications on the mobile device;
   determining one or more frequently used software applications on the mobile device based on the daily usage of the software applications on the mobile device;
   selecting, by the processor, one of a plurality of progressively more stringent operating modes for the mobile device based on a difference between the next payment due date and a current date, wherein at least one of the plurality of progressively more stringent operating modes disables or restricts at least one of the determined one or more frequently used software applications on the mobile device; and
   operating the mobile device in the selected operating mode for a period of time.

2. The method of claim 1, wherein querying the payment server associated with the lender of the mobile device to determine the next payment due date comprises:
   determining, by the processor, whether an account balance has been paid in full; and
   resetting, by the processor, the non-volatile indication allocated to lender binding in response to determining that the account balance has been paid in full.

3. The method of claim 2, further comprising the processor setting the non-volatile indication allocated to lender binding in response to determining that the mobile device is subject to a new loan.

4. The method of claim 1, wherein selecting one of the plurality of progressively more stringent operating modes for the mobile device based on the difference between the next payment due date and the current date comprises:
   determining, by the processor, that the difference between the next payment due date and the current date is within a first period of time; and
   selecting, by the processor, an encumbered operating mode that requires that the mobile device display a payment-due reminder on an electronic display of the mobile device at a periodic interval in response to determining that the difference between the next payment due date and the current date is within the first period of time.

5. The method of claim 4, wherein selecting one of the plurality of progressively more stringent operating modes for the mobile device based on the difference between the next payment due date and the current date comprises:
   determining, by the processor, that the difference between the next payment due date and the current date is within a second period of time; and
   selecting, by the processor, an encumbered operating mode that requires that the mobile device display a timer indicating an amount of time remaining until the next payment due date in response to determining that the difference between the next payment due date and the current date is within the second period of time.

6. The method of claim 5, wherein selecting one of the plurality of progressively more stringent operating modes for the mobile device based on the difference between the next payment due date and the current date comprises:

determining, by the processor, that the difference between the next payment due date and the current date is within a third period of time; and selecting, by the processor, an encumbered operating mode that disables or restricts the use of one or more most frequently used software applications on the mobile device in response to determining that the difference between the next payment due date and the current date is within the third period of time.

7. The method of claim 1, wherein selecting one of the plurality of progressively more stringent operating modes for the mobile device based on the difference between the next payment due date and the current date comprises:

determining, by the processor, that the difference between the next payment due date and the current date is within a fourth period of time; and selecting, by the processor, an encumbered operating mode that restricts the use of cellular and WLAN capabilities of the mobile device to only allow communications to a server associated with the lender in response to determining that that the difference between the next payment due date and the current date is within the fourth period of time.

8. The method of claim 1, wherein selecting one of the plurality of progressively more stringent operating modes for the mobile device based on the difference between the next payment due date and the current date comprises:

determining, by the processor, that the next payment due date is more than a threshold amount of time prior to the current date; and selecting, by the processor, an encumbered operating mode that disables the mobile device until a suitable passcode is entered.

9. A mobile device, comprising:

a processor configured with processor-executable instructions to:

determine whether a non-volatile indication allocated to lender binding has been set;

query a payment server associated with a lender of the mobile device to determine a next payment due date in response to determining that the non-volatile indication allocated to lender binding has been set;

monitor daily usage of software applications on the mobile device;

determine one or more frequently used software applications on the mobile device based on the daily usage of the software applications on the mobile device;

select one of a plurality of progressively more stringent operating modes for the mobile device based on a difference between the next payment due date and a current date, wherein at least one of the plurality of progressively more stringent operating modes disables or restricts at least one of the determined one or more frequently used software applications on the mobile device; and operate the mobile device in the selected operating mode for a period of time.

10. The mobile device of claim 9, wherein the processor is configured to query the payment server associated with the lender of the mobile device to determine the next payment due date by:

determining whether an account balance has been paid in full; and resetting the non-volatile indication allocated to lender binding in response to determining that the account balance has been paid in full.

11. The mobile device of claim 10, wherein the processor is further configured to set the non-volatile indication allocated to lender binding in response to determining that the mobile device is subject to a new loan.

12. The mobile device of claim 9, wherein the processor is configured to select one of the plurality of progressively more stringent operating modes for the mobile device based on the difference between the next payment due date and the current date by:

determining that the difference between the next payment due date and the current date is within a first period of time; and selecting an encumbered operating mode that requires that the mobile device display a payment-due reminder on an electronic display of the mobile device at a periodic interval in response to determining that the difference between the next payment due date and the current date is within the first period of time.

13. The mobile device of claim 9, wherein the processor is configured to select one of the plurality of progressively more stringent operating modes for the mobile device based on the difference between the next payment due date and the current date by:

determining that the difference between the next payment due date and the current date is within a second period of time; and selecting an encumbered operating mode that requires that the mobile device display a timer indicating a number of hours, minutes, and seconds remaining until the next payment due date in response to determining that the difference between the next payment due date and the current date is within the second period of time.

14. The mobile device of claim 9, wherein the processor is configured to select one of the plurality of progressively more stringent operating modes for the mobile device based on the difference between the next payment due date and the current date by:

determining that the difference between the next payment due date and the current date is within a third period of time; and selecting an encumbered operating mode that disables or restricts the use of one or more most frequently used software applications on the mobile device in response to determining that the difference between the next payment due date and the current date is within the third period of time.

15. The mobile device of claim 9, wherein the processor is configured to select one of the plurality of progressively more stringent operating modes for the mobile device based on the difference between the next payment due date and the current date by:

determining that the difference between the next payment due date and the current date is within a fourth period of time; and selecting an encumbered operating mode that restricts the use of cellular and WLAN capabilities of the mobile device to only allow communications to a server associated with the lender in response to determining that that the difference between the next payment due date and the current date is within the fourth period of time.

16. The mobile device of claim 9, wherein the processor is configured to select one of the plurality of progressively more stringent operating modes for the mobile device based on the difference between the next payment due date and the current date by:

determining that the next payment due date is more than an amount of time prior to the current date; and selecting an encumbered operating mode that disables the mobile device until a suitable passcode is entered by the user of the mobile device.

17. A non-transitory computer readable storage medium having stored thereon processor-executable software instructions configured to cause a processor in a mobile device to perform operations comprising:
   determining whether a non-volatile indication allocated to lender binding has been set;
   querying a payment server associated with a lender of the mobile device to determine a next payment due date in response to determining that the non-volatile indication allocated to lender binding has been set;
   monitoring daily usage of software applications on the mobile device;
   determining one or more frequently used software applications on the mobile device based on the daily usage of the software applications on the mobile device;
   selecting one of a plurality of progressively more stringent operating modes for the mobile device based on a difference between the next payment due date and a current date, wherein at least one of the plurality of progressively more stringent operating modes disables or restricts at least one of the determined one or more frequently used software applications on the mobile device; and
   operating the mobile device in the selected operating mode for a period of time.

18. The non-transitory computer readable storage medium of claim 17, wherein the stored processor-executable software instructions are configured to cause a processor to perform operations such that querying the payment server associated with the lender of the mobile device to determine the next payment due date comprises:
   determining whether an account balance has been paid in full; and
   resetting the non-volatile indication allocated to lender binding in response to determining that the account balance has been paid in full.

19. The non-transitory computer readable storage medium of claim 18, wherein the stored processor-executable software instructions are configured to cause a processor to perform operations further comprising the processor setting the non-volatile indication allocated to lender binding in response to determining that the mobile device is subject to a new loan.

20. The non-transitory computer readable storage medium of claim 17, wherein the stored processor-executable software instructions are configured to cause a processor to perform operations such that selecting one of the plurality of progressively more stringent operating modes for the mobile device based on the difference between the next payment due date and the current date comprises:
   determining that the difference between the next payment due date and the current date is within a first period of time; and
   selecting an encumbered operating mode that requires that the mobile device display a payment-due reminder on an electronic display of the mobile device at a periodic interval in response to determining that the difference between the next payment due date and the current date is within the first period of time.

21. The non-transitory computer readable storage medium of claim 17, wherein the stored processor-executable software instructions are configured to cause a processor to perform operations such that selecting one of the plurality of progressively more stringent operating modes for the mobile device based on the difference between the next payment due date and the current date comprises:
   determining that the difference between the next payment due date and the current date is within a second period of time; and
   selecting an encumbered operating mode that requires that the mobile device display a timer indicating a number of hours, minutes, and seconds remaining until the next payment due date in response to determining that the difference between the next payment due date and the current date is within the second period of time.

22. The non-transitory computer readable storage medium of claim 17, wherein the stored processor-executable software instructions are configured to cause a processor to perform operations such that selecting one of the plurality of progressively more stringent operating modes for the mobile device based on the difference between the next payment due date and the current date comprises:
   determining that the difference between the next payment due date and the current date is within a third period of time; and
   selecting an encumbered operating mode that disables or restricts the use of one or more most frequently used software applications on the mobile device in response to determining that the difference between the next payment due date and the current date is within the third period of time.

23. The non-transitory computer readable storage medium of claim 17, wherein the stored processor-executable software instructions are configured to cause a processor to perform operations such that selecting one of the plurality of progressively more stringent operating modes for the mobile device based on the difference between the next payment due date and the current date comprises:
   determining that the difference between the next payment due date and the current date is within a fourth period of time; and
   selecting an encumbered operating mode that restricts the use of cellular and WLAN capabilities of the mobile device to only allow communications to a server associated with the lender in response to determining that that the difference between the next payment due date and the current date is within the fourth period of time.

24. The non-transitory computer readable storage medium of claim 17, wherein the stored processor-executable software instructions are configured to cause a processor to perform operations such that selecting one of the plurality of progressively more stringent operating modes for the mobile device based on the difference between the next payment due date and the current date comprises:
   determining that the next payment due date is more than an amount of time prior to the current date; and
   selecting an encumbered operating mode that disables the mobile device until a suitable passcode is entered by the user of the mobile device.

25. A mobile device, comprising:
   means for determining whether a non-volatile indication allocated to lender binding has been set;
   means for querying a payment server associated with a lender of the mobile device to determine a next payment due date in response to determining that the non-volatile indication allocated to lender binding has been set;
   means for monitoring daily usage of software applications on the mobile device;

means for determining one or more frequently used software applications on the mobile device based on the daily usage of the software applications on the mobile device;

means for selecting one of a plurality of progressively more stringent operating modes for the mobile device based on a difference between the next payment due date and a current date, wherein at least one of the plurality of progressively more stringent operating modes comprises means for disabling or restricting at least one of the determined one or more frequently used software applications on the mobile device; and means for operating the mobile device in the selected operating mode for a period of time.

26. The mobile device of claim 25, wherein means for querying the payment server associated with the lender of the mobile device to determine the next payment due date comprises:

means for determining whether an account balance has been paid in full; and means for resetting the non-volatile indication allocated to lender binding in response to determining that the account balance has been paid in full.

27. The mobile device of claim 26, further comprising means for setting the non-volatile indication allocated to lender binding in response to determining that the mobile device is subject to a new loan.

28. The mobile device of claim 25, wherein means for selecting one of the plurality of progressively more stringent operating modes for the mobile device based on the difference between the next payment due date and the current date comprises:

means for determining that the difference between the next payment due date and the current date is within a first period of time; and means for selecting an encumbered operating mode that requires that the mobile device display a payment-due reminder on an electronic display of the mobile device at a periodic interval in response to determining that the difference between the next payment due date and the current date is within the first period of time.

29. The mobile device of claim 25, wherein means for selecting one of the plurality of progressively more stringent operating modes for the mobile device based on the difference between the next payment due date and the current date comprises:

means for determining that the difference between the next payment due date and the current date is within a second period of time; and means for selecting an encumbered operating mode that requires that the mobile device display a timer indicating a number of hours, minutes, and seconds remaining until the next payment due date in response to determining that the difference between the next payment due date and the current date is within the second period of time.

30. The mobile device of claim 25, wherein means for selecting one of the plurality of progressively more stringent operating modes for the mobile device based on the difference between the next payment due date and the current date comprises at least one of:

means for selecting an encumbered operating mode that disables or restricts the use of one or more most frequently used software applications on the mobile device in response to determining that the difference between the next payment due date and the current date is within a third period of time; or means for selecting another encumbered operating mode that restricts the use of cellular and WLAN capabilities of the mobile device to only allow communications to a server associated with the lender in response to determining that the difference between the next payment due date and the current date is within a fourth period of time.

\* \* \* \* \*